United States Patent
Dorsey et al.

(10) Patent No.: US 9,128,721 B2
(45) Date of Patent: Sep. 8, 2015

(54) CLOSED LOOP CPU PERFORMANCE CONTROL

(71) Applicant: Apple Inc., Cupertino, CA (US)

(72) Inventors: John G. Dorsey, San Francisco, CA (US); James S. Ismail, San Jose, CA (US); Keith Cox, Campbell, CA (US); Gaurav Kapoor, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 13/913,307

(22) Filed: Jun. 7, 2013

(65) Prior Publication Data

US 2014/0164757 A1    Jun. 12, 2014

Related U.S. Application Data

(60) Provisional application No. 61/735,944, filed on Dec. 11, 2012.

(51) Int. Cl.
  *G06F 1/24*    (2006.01)
  *G06F 1/32*    (2006.01)
  *G06F 1/26*    (2006.01)

(52) U.S. Cl.
  CPC .............. *G06F 1/3296* (2013.01); *G06F 1/324* (2013.01); *G06F 1/26* (2013.01); *Y02B 60/1217* (2013.01); *Y02B 60/1285* (2013.01)

(58) Field of Classification Search
  CPC ..................................... G06F 1/32; G06F 1/26
  USPC .................................................. 713/100, 300
  See application file for complete search history.

(56) References Cited

U.S. PATENT DOCUMENTS

| 7,139,017 B2 | 11/2006 | Ali et al. |
| 7,770,034 B2 | 8/2010 | Nanja |

(Continued)

FOREIGN PATENT DOCUMENTS

| WO | 95/31782 | 11/1995 |
| WO | 99/46608 | 9/1999 |

OTHER PUBLICATIONS

International Search Report, Application No. PCT/US2013/062024, dated Jan. 23, 2014.

(Continued)

*Primary Examiner* — Jaweed A Abbaszadeh
*Assistant Examiner* — Phil Nguyen
(74) *Attorney, Agent, or Firm* — Downey Brand LLP

(57) ABSTRACT

The invention provides a technique for targeted scaling of the voltage and/or frequency of a processor included in a computing device. One embodiment involves scaling the voltage/frequency of the processor based on the number of frames per second being input to a frame buffer in order to reduce or eliminate choppiness in animations shown on a display of the computing device. Another embodiment of the invention involves scaling the voltage/frequency of the processor based on a utilization rate of the GPU in order to reduce or eliminate any bottleneck caused by slow issuance of instructions from the CPU to the GPU. Yet another embodiment of the invention involves scaling the voltage/frequency of the CPU based on specific types of instructions being executed by the CPU. Further embodiments include scaling the voltage and/or frequency of a CPU when the CPU executes workloads that have characteristics of traditional desktop/laptop computer applications.

30 Claims, 18 Drawing Sheets

(56) References Cited

U.S. PATENT DOCUMENTS

| | | |
|---|---|---|
| 2002/0087291 A1 | 7/2002 | Cooper |
| 2003/0115428 A1* | 6/2003 | Zaccarin et al. .............. 711/156 |
| 2003/0131269 A1* | 7/2003 | Mizyuabu et al. ............ 713/320 |
| 2005/0125637 A1 | 6/2005 | Dijkstra et al. |
| 2006/0083168 A1* | 4/2006 | Prakash ........................ 370/230 |
| 2006/0106923 A1 | 5/2006 | Balasubramonian et al. |
| 2007/0250689 A1 | 10/2007 | Aristodemou et al. |
| 2008/0247451 A1* | 10/2008 | Yamaguchi ................... 375/226 |
| 2010/0077232 A1 | 3/2010 | Jahagirdar et al. |
| 2010/0185888 A1* | 7/2010 | Hahn et al. .................... 713/340 |
| 2011/0031996 A1 | 2/2011 | Momtaz |
| 2011/0055603 A1 | 3/2011 | Wolfe |
| 2011/0286468 A1* | 11/2011 | Tomonaga et al. ........... 370/412 |
| 2012/0054772 A1 | 3/2012 | Raveendran |
| 2012/0084591 A1 | 4/2012 | Tupman |
| 2012/0162234 A1 | 6/2012 | Blinzer et al. |
| 2012/0249564 A1 | 10/2012 | Liu et al. |

OTHER PUBLICATIONS

Written Opinion, Application No. PCT/US2013/062024, dated Jan. 23, 2014.

* cited by examiner

CLOSED LOOP CPU PERFORMANCE CONTROL

CROSS REFERENCE TO RELATED APPLICATIONS

This application is related to and claims the benefits under 35 U.S.C. 119(e) of U.S. Provisional Patent Application No. 61/735,944, filed on Dec. 11, 2012, entitled "CLOSED LOOP PERFORMANCE CONTROL", which is hereby incorporated by reference herein in its entirety.

TECHNICAL FIELD

The present invention relates generally to power management in a mobile computing device. More particularly, the present invention relates to power management techniques that correlate to central processor unit (CPU) activity, memory controller (MC) activity, graphics processing unit (GPU) activity, and user interface (UI) frame rate activity within the mobile computing device.

BACKGROUND

Conventional computing devices (e.g., desktop computers and laptop computers) typically implement one or more algorithms directed to controlling the operating clock frequency and voltage of processors included therein, such as a CPU and a GPU. These algorithms are directed to monitoring the CPU/GPU for workloads that take more than a threshold amount of time to complete. Consider, for example, a time-intensive image processing workload that takes several minutes for a CPU/GPU to execute when the CPU/GPU are in a low-performance operating mode. In this example, the algorithms detect that the workload meets certain criteria (e.g., the threshold amount of time has passed or processor duty factor has exceeded a threshold) and cause the CPU/GPU to switch from a low-performance operating mode to a mid-performance or a high-performance operating mode so that the workload is completed sooner. These algorithms enable conventional computing devices to reduce power for short, bursty workloads while providing high performance for long-running compute tasks.

Notably, recent years have shown a proliferation in the usage of mobile computing devices with performance characteristics, energy constraints and interactive user interfaces that are different from those of desktop/laptop computers, which affect the types of workloads users execute on mobile devices. More specifically, unlike traditional long-running pure-compute tasks, mobile applications instead emphasize interactive performance for visual scenarios such as web browsing, gaming and photography. Consequently, the aforementioned algorithms—which are directed to identifying and responding to complex, time-intensive workloads—are not as effective when implemented in mobile devices since the algorithms cannot accurately determine when the operating mode of the CPU/GPU should be modified.

SUMMARY

This paper describes various embodiments that relate to the operation of CPU performance control algorithms within a mobile computing device. In contrast to conventional approaches, these performance control algorithms can operate based on feedback received from various components included in the mobile computing device, such as a frame buffer, a GPU and a memory controller. For example, instead of focusing solely on the amount of time a workload spends executing on the CPU, the techniques presented herein measure the smoothness of UI animations presented on a display of the mobile computing device, the utilization rates of the GPU or memory interfaces, and the types of instructions being executed by the CPU.

One embodiment of the invention sets forth a method for updating an operating mode of a processor. The method includes the steps of monitoring a cycle-to-cycle jitter associated with a rate by which a user interface (UI) is animated, and, further, adjusting an operating mode of the processor based on the cycle-to-cycle jitter. Adjusting the operating mode of the processor comprises adjusting the voltage and/or frequency at which the processor is operating. Moreover, monitoring the cycle-to-cycle jitter comprises analyzing a rate of change in a number of frames per second (NFPS) being input to a frame buffer associated with the processor. Further, monitoring the cycle-to-cycle jitter comprises establishing: a jitter control signal based on short-term sampling of the NFPS being input to the frame buffer, and a trend control signal based on long-term sampling of the NFPS being input to the frame buffer.

Another embodiment of the invention sets forth a method for optimizing operations of a CPU in a mobile computing device having the CPU configured to issue instructions to a GPU. The method includes the steps of determining that a utilization rate of the GPU is exceeding a threshold level, determining that the CPU is operating in a sub-optimal operating mode, and causing the CPU to enter into an optimal operating mode where the CPU generates instructions for execution by the GPU at a faster rate. Causing the CPU to enter into the optimal operating mode includes establishing a control signal by a control signal generator. Causing the CPU to enter into the optimal operating mode includes adjusting the voltage and/or frequency at which the CPU is operating. The method can further include the steps of determining that the utilization rate of the GPU is no longer exceeding the threshold level, and causing the CPU to return to a more energy-efficient operating mode.

A third embodiment of the invention sets forth a method for updating an operating mode of a CPU. The method includes the steps of determining that the CPU is tasked with executing instructions that are associated with a high instruction-per-cycle density, and causing the CPU to enter into a high-performance operating mode to cause an increase in the rate at which the CPU executes the instructions. The instructions can comprise integer arithmetic instructions, vector floating point (VFP) arithmetic instructions, single-instruction multiple-data (SIMD) arithmetic instructions, and load-store instructions. The method can further include the steps of establishing: an integer arithmetic control signal based on the rate at which integer arithmetic instructions are being executed by the CPU, a VFP control signal based on the rate at which VFP arithmetic instructions are being executed by the CPU, a SIMD control signal based on the rate at which SIMD arithmetic instructions are being executed by the CPU, and a load-store control signal based on the rate at which load-store instructions are being executed by the CPU.

Yet another embodiment of the invention sets forth a method for optimizing operations of a CPU in a mobile computing device having the CPU configured to perform transactions with a memory controller that manages access to a dynamic random-access memory (DRAM) and a flash memory. The method includes the steps of determining that the data throughputs of memory controller exchanges with one or more agents are exceeding threshold levels, determining that the CPU is operating in a sub-optimal operating mode, and causing the CPU to enter into an optimal operating mode where the CPU performs transactions with the memory controller at a faster rate. The agents can include the CPU itself or a flash memory subsystem.

An additional embodiment of the invention sets forth a method for updating an operating mode of a CPU while executing workloads that have characteristics of traditional desktop/laptop computer applications. The method includes the steps of determining that a utilization rate of the CPU is exceeding a threshold level, determining that the interactive user interface is updating below a threshold rate, and causing the CPU to enter into a high-performance operating mode to allow the mobile device to complete the task more quickly.

Other embodiments include a non-transitory computer readable medium storing instructions that, when executed by a processor, cause the processor to carry out any of the method steps described above. Further embodiments include a system that includes at least a processor and a memory storing instructions that, when executed by the processor, cause the processor to carry out any of the method steps described above. Yet other embodiments include a system having a management co-processor separate from the main CPU capable of, either in cooperation with or in place of the main CPU, carrying out any of the method steps described above.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

In the figures, elements referred to with the same or similar reference numerals include the same or similar structure, use, or procedure, as described in the first instance of occurrence of the reference numeral.

DETAILED DESCRIPTION

Figure 1:
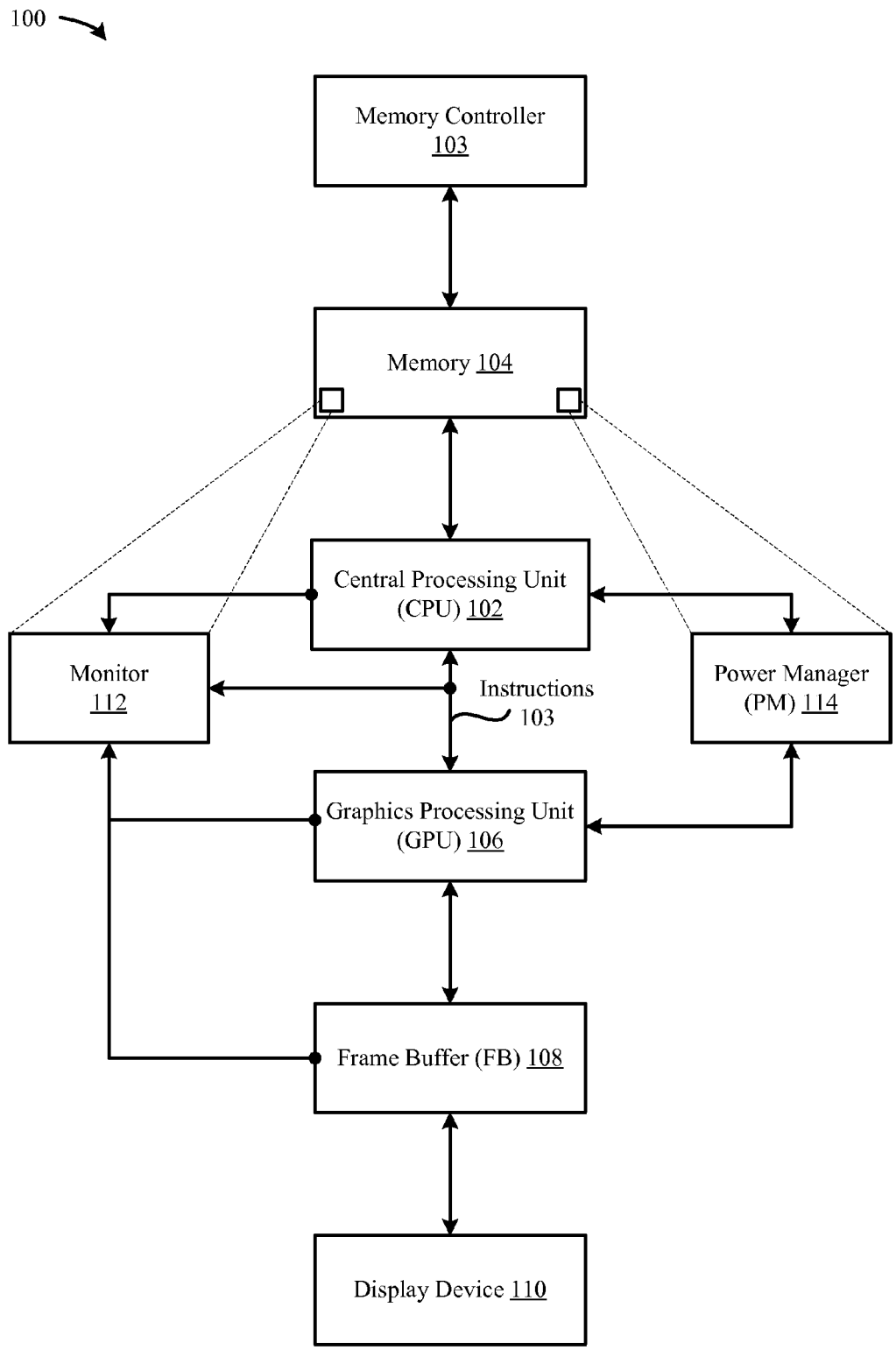
FIG. 1 illustrates a block diagram of a mobile computing device configured to implement embodiments of the invention.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

As set forth above, embodiments of the invention are directed to scaling the voltage and/or frequency of a CPU included in a mobile computing device. In particular, the embodiments are directed to alleviating a variety of performance and energy efficiency issues that are often exhibited by mobile computing devices and that are not well-addressed by conventional power-management techniques. As set forth in greater detail below, the embodiments alleviate these performance and energy efficiency issues by implementing techniques that focus on various aspects of how processes are carried out within the mobile computing device. For example, one embodiment of the invention involves scaling the voltage and/or frequency of the CPU based on the number of frames per second (NFPS) being input to a frame buffer in order to reduce or eliminate choppiness in animations shown on a display of the mobile computing device. Another embodiment of the invention involves scaling the voltage and/or frequency of the CPU based on a utilization rate of the GPU in order to reduce or eliminate any bottleneck caused by slow issuance of instructions from the CPU to the GPU. A third embodiment of the invention involves scaling the voltage and/or frequency of the CPU based on the throughput of data transiting the memory controller. A fourth embodiment of the invention involves scaling the voltage and/or frequency of the CPU based on specific types of instructions being executed by the CPU. An additional embodiment of the invention involves scaling the voltage and/or frequency of the CPU based on the duty factor of the CPU for workloads that cause a user interface to animate below a threshold rate.

As noted above, one existing performance issue exhibited by mobile computing devices involves the smoothness of animations shown on a display of the mobile computing device. For example, choppy display of an animation (e.g., scrolling of a web page) contributes to a poor user experience and should be eliminated whenever possible. Accordingly, one embodiment of the invention involves scaling the voltage and/or frequency of the CPU based on the number of frames-per-second (NFPS) being supplied to a frame buffer included in the mobile computing device. In particular, a monitor measures short-term "jitter" in the NFPS being input to the frame buffer as well as the long-term stability of the NFPS being input to the frame buffer to determine whether the CPU is operating at a power and/or frequency sufficient to produce smooth animations. More specifically, when the monitor observes changes in the NFPS, the monitor increases the voltage and/or frequency of the CPU to smooth out the NFPS. Conversely, when the monitor observes that the NFPS is stable, the monitor decreases the voltage and/or frequency of the CPU in order to conserve energy.

Another existing performance issue exhibited by mobile computing devices involves the bottleneck that often occurs between instructions issued by CPU to the GPU. For example, the CPU can operate in a sub-optimal mode when the activity of the GPU is such that the GPU requests new instructions from the CPU at a rate faster than the CPU can produce the new instructions (e.g., during GPU benchmark tests). While in the sub-optimal mode, the CPU can operate at a sub-optimal voltage and/or frequency. Accordingly, when it is determined that a utilization rate of the GPU is exceeding a threshold level and that the CPU is operating in a sub-optimal operating mode, the CPU can be configured to enter into an optimal operating mode, which increases the rate at which the CPU generates instructions to be executed by the GPU. Adjusting the operating mode of the CPU can include adjusting the voltage and/or frequency at which the CPU is operating. Later, when it can be determined that the utilization rate of the GPU is no longer exceeding the threshold level, the CPU can be configured to enter back into the sub-optimal operating mode. In this manner, critical GPU workloads—such as graphics benchmarks—are not hindered by the CPU when the CPU is operating at a sub-optimal voltage and/or frequency.

Yet another existing performance issue exhibited by mobile computing devices involves the bottleneck that is introduced when the CPU manages data flows between the memory controller and one or more memory agents. For example, the CPU can operate in a sub-optimal mode when encoding a video and writing the result to DRAM at a rate slower than a rate at which the memory interface is capable of operating. As another example, the CPU can operate in a sub-optimal mode when executing a flash memory subsystem device driver for the purpose of reading data from the flash memory subsystem, where executing the driver slowly may increase access latency. While in the sub-optimal mode, the CPU can operate at a sub-optimal voltage and/or frequency. Accordingly, when it is determined that a read or write throughput of traffic between the CPU and the memory controller is exceeding threshold levels—or, that the read or write throughput of traffic between the flash memory subsystem and the memory controller is exceeding threshold levels, and that the CPU is operating in a sub-optimal operating mode—the CPU can be configured to enter into an optimal operating mode. Later, when it can be determined that these throughputs are no longer exceeding the threshold levels, the CPU can be configured to enter back into the sub-optimal operating mode.

Another existing energy efficiency issue exhibited by mobile computing devices involves erroneously increasing the voltage and/or frequency of the CPU solely based on the utilization rate of the CPU. For example, a simple spin loop workload—such as a loop that frequently checks for a specific condition to be met—may increase the utilization rate of the CPU to 99% and cause, via conventional algorithms, the voltage and/or frequency of the CPU to be increased. Importantly, in this example, such an increase in no way promotes a faster completion of the spin loop, so energy is wasted in doing so. However, some specific workloads executed by the CPU—such as those involving integer arithmetic, VFP arithmetic, SIMD arithmetic and load-store operations—can benefit from an increase in the voltage and/or frequency of the CPU. Accordingly, yet another embodiment of the invention involves the monitor analyzing the rate at which certain types of instructions are being executed by the CPU and scaling the voltage and/or frequency of the CPU based on the rate. In this manner, wasteful CPU performance increases can be avoided, thereby saving energy.

Another existing energy efficiency issue exhibited by mobile computing devices involves erroneously increasing the voltage and/or frequency of the CPU solely based on the utilization rate of the CPU while executing workloads for which a user is not waiting for results. For example, a video game containing a spinloop may exhibit high CPU utilization, but increasing the voltage and/or frequency of the CPU by conventional algorithms will increase CPU power while possibly not increasing the NFPS produced by the game. By contrast, a circuit layout optimization tool may also exhibit high CPU utilization, but here increasing the voltage and/or frequency of the CPU by conventional algorithms may reduce the time a user must wait for the result of the computation. Accordingly, another embodiment of the invention involves monitoring the UI frame rate and increasing the voltage and/or frequency of the CPU by conventional algorithms only when the UI frame rate is below a threshold and the CPU utilization is above a threshold. When the UI is not a principal component of the workload, this embodiment permits the energy budget of the mobile device to be biased towards CPU-based computation.

According to these techniques, the default operating mode of the CPU is minimum performance, and increased performance is provided only to workloads that can benefit from such an increase. For example, by scaling the operating mode of the CPU relative to UI frame rate smoothness, interactive applications that do not benefit from the higher performance of newer CPUs can save tens to thousands of milliwatts relative to existing power management algorithms. At the same time, high-end graphical applications are permitted to access the full compute performance of both the CPU and the GPU. High-throughput data transaction workloads are similarly permitted to access the full compute performance of the CPU. Monitoring arithmetic and load-store instruction densities enables a distinction to be established between workloads that perform useful computations with additional CPU performance and those that do not, thereby saving hundreds of milliwatts on applications that task the CPU with executing "busy loops." Finally, by considering the UI frame rate, the use of conventional algorithms that increase CPU performance in response to high CPU utilization can be enabled when the user is waiting for a time-intensive computation to complete, but disabled for animation workloads that may not benefit from increased performance.

As set forth above, various embodiments of the invention are directed to scaling of the voltage and/or frequency of a CPU included in a mobile computing device. A detailed description of the embodiments is provided below in conjunction with FIGS. 1, 2A-2E, 3A-3C, and 4A-4E. In particular, FIG. 1 illustrates a block diagram of a mobile computing device 100 configured to implement embodiments of the invention. As shown in FIG. 1, mobile computing device 100 includes subsystems such as CPU 102, a memory controller 103, a system memory 104, GPU 106, frame buffer 108, and display device 110. As is well-known, CPU 102 generates and transmits instructions 103 to GPU 106 for execution, where GPU 106 consumes the instructions at a rate that is influenced at least by the utilization rate of GPU 106 and a rate at which CPU 102 is generating and transmitting the instructions 103 to GPU 106. Frame buffer 108 is configured to continually receive and store an updated sequence of frames that are eventually output to display device 110. Also shown in FIG. 1 are monitor 112 and power manager 114, which are loaded in system memory 104 and configured to execute on mobile computing device 100. In one embodiment, system memory 104 include both a DRAM subsystem (not illustrated) and a flash memory subsystem (not illustrated) that are managed by the memory controller 103. Although not illustrated in FIG. 1, each of monitor 112 and power manager 114 can run on an operating system (OS) that is configured to execute on mobile computing device 100. Additionally, monitor 112 and power manager 114 can run on a management co-processor (not illustrated) that is separate and distinct from the CPU 102.

As described in greater detail below, monitor 112 is configured to implement various techniques directed toward identifying circumstances where a change in the voltage and/or frequency of CPU 102 is beneficial to the overall performance of mobile computing device 100 and energy savings within mobile computing device 100. In particular, monitor 112 receives, from a number of controllers, control signals that scale with a focus on a particular activity within mobile computing device 100, e.g., the rate of change in the NFPS being input to the frame buffer 108, the utilization rate of GPU 106, the data throughputs of the memory controller 103, the rate at which specific types of instructions are being executed by CPU 102, or the rate at which a user interface is being updated. In turn, monitor 112 processes the control signals and outputs the control signals to power manager 114, whereupon the power manager 114 correspondingly scales the voltage and/or frequency of CPU 102. For example, one control signal can slowly increase in value (e.g., the utilization rate of GPU 106) and cause the power manager 114 to correspondingly increase the voltage and/or frequency of CPU 102, thereby reducing or eliminating a potential bottleneck that might occur between the rate at which GPU 106 is able to consume instructions issued by CPU 102.

In one embodiment, each controller produces a scalar value—also referred to herein as a "control effort"—that takes on a value from 0 to 255, where larger values are expressions of a desire for higher performance. Each of the controllers produces a control effort value independently of the other controllers. As described in greater detail below, the control effort value that determines the CPU 102 performance configuration is the maximum of the individual control efforts. Given the winning control effort, the mapping to a CPU 102 performance configuration may vary. In one embodiment, the range 0-255 may be linearly mapped to qualified CPU 102 frequencies. In a related embodiment, the mapping may instead be linear in CPU 102 voltage rather than frequency. In another embodiment, the mapping may involve the use of frequency/voltage dithering to produce a more precise mapping through pulse width modulation techniques. In yet another embodiment, the mapping may also determine the number of CPU 102 cores that may be concurrently active in a multi-core environment. For example, a lower control effort value may restrict the mobile computing device 100 to single-core operation as a means of conserving energy. In yet another embodiment, the mapping may also determine the selection of a primary core or secondary core, where the primary core is more powerful than the secondary core and is configured to operate during high demand periods, and where the secondary core is less powerful than the primary core and is configured to operate during low demand periods.

Figure 2A:
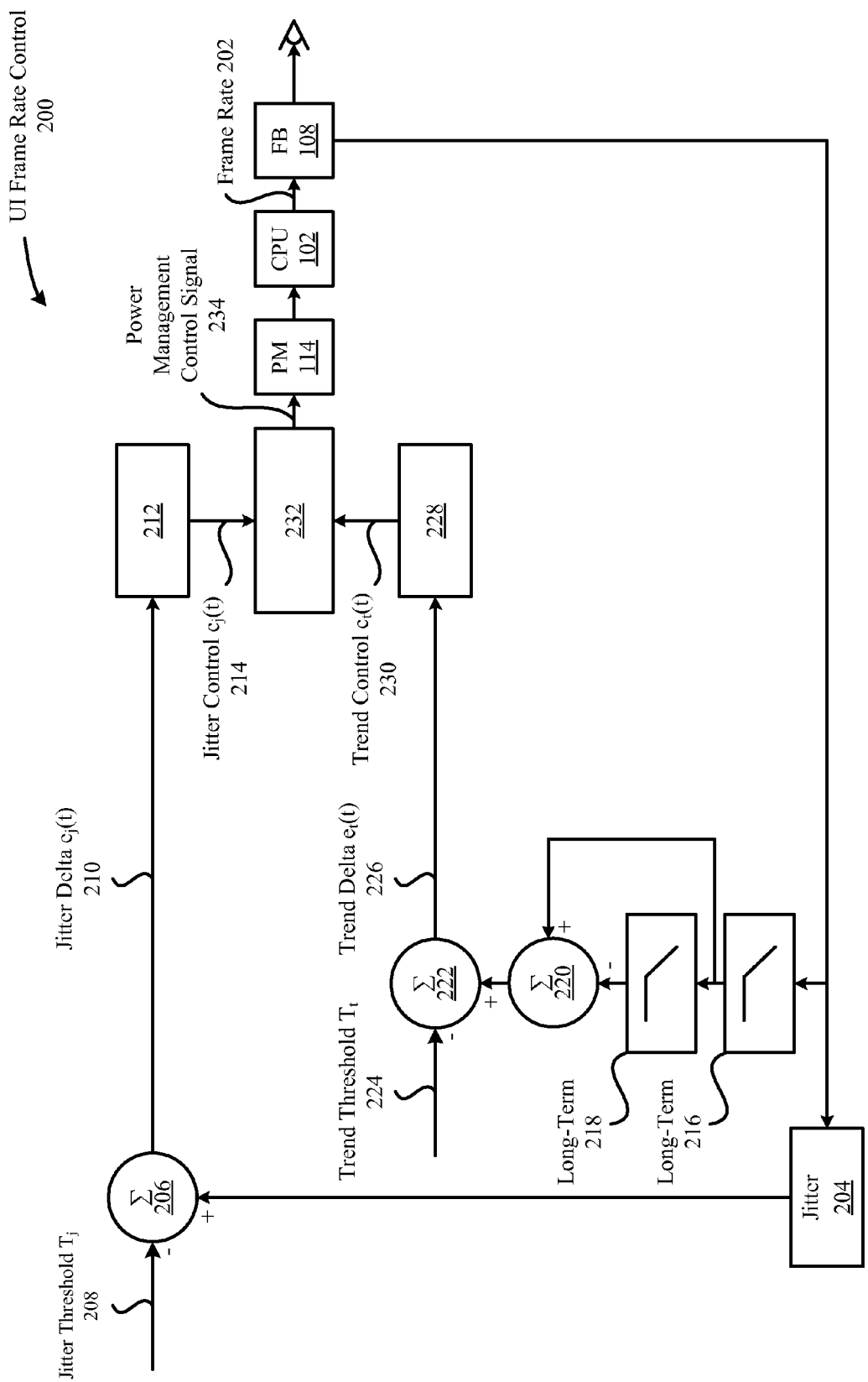
FIG. 2A illustrates a conceptual diagram of an embodiment directed to scaling the voltage and/or frequency of a CPU based on the NFPS being supplied to a frame buffer.

FIG. 2A illustrates a conceptual diagram 200 of the embodiment directed to scaling the voltage and/or frequency of CPU 102 based on the NFPS being input to frame buffer 108. As shown in FIG. 2A, the NFPS being input to frame buffer 108 is represented by frame rate 202, which is analyzed by monitor 112 and observed by a user of mobile computing device 100 via display device 110. Jitter component 204, which is managed by monitor 112, is configured to analyze (via the outermost loop of FIG. 2A) short-term changes (i.e., cycle-to-cycle jitter) in the NFPS being input to frame buffer 108 within a short-term threshold amount of time. Notably, the NFPS being input to frame buffer 108 is correlated to the smoothness of user interfaces (UIs) that are displayed on display device 110, which significantly impacts overall user experience. In one embodiment, the cycle-to-cycle jitter is defined as the difference in instantaneous frame rates over two consecutive frame rate samples. Consider, for example, the absolute times of three sequential frame buffer 108 updates T1, T2 and T3, where the instantaneous frame rate F(1 to 2)=1/(T2−T1) and the instantaneous frame rate F(2 to 3)=1/(T3−T2). According to this example, the cycle-to-cycle jitter associated with this sequence is equal to the absolute value of (F(2 to 3)−F(1 to 2)), which is then output by jitter component 204 and compared at comparator 206 against a jitter threshold $T_j$ 208 (e.g., three frames per second (FPS)).

As shown in FIG. 2A, comparator 206 is configured to output a jitter delta $e_j(t)$ 210 to jitter control signal generator 212. When the output of jitter component 204 is less than jitter threshold $T_j$ 208, the jitter delta $e_j(t)$ 210 is negative, which is what allows the comparator 206 to unwind when performance is sufficient to enable smooth animation. The jitter control signal generator 212 can be any form of a controller filter that is closed-loop stable. In one embodiment, the jitter control signal generator 212 can be an integrator that, in turn, integrates jitter deltas $e_j(t)$ 210 as they are output by comparator 206 and outputs a jitter control signal $c_j(t)$ 214. In one embodiment, jitter control signal generator 212 can be configured to apply a gain $K_j$ to the integrated jitter deltas $e_j(t)$ 210 in order to amplify the jitter control signal $c_j(t)$ 214. Next, the jitter control signal $c_j(t)$ 214 is directed to max-selector 232, which outputs a maximum of the jitter control signal $c_j(t)$ 214, or a trend control signal $c_t(t)$ 230 that is produced according to the innermost loop of FIG. 2A described below.

More specifically, the innermost loop of FIG. 2A represents monitor 112 analyzing long-term changes that occur in the NFPS being input to frame buffer 108 within a long-term threshold amount of time. Specifically, a long-term sample 216 and a long-term sample 218 are analyzed at comparator 220 to produce a trend value that represents the rate of change of the NFPS being input to frame buffer 108 over the long-term threshold amount of time. The absolute value of the trend value is then compared at comparator 222 against a trend threshold $T_t$ 224 (e.g., one FPS), and comparator 222 outputs a trend delta $e_t(t)$ 226 to trend control signal generator 228. The trend control signal generator 228 can be any form of a controller filter that is closed-loop stable. In one embodiment, the trend control signal generator 228 can be an integrator that, in turn, integrates trend deltas $e_t(t)$ 226 as they are output by comparator 222 and outputs the trend control signal $c_t(t)$ 230. The trend control signal generator 228 can also be configured to apply a gain $K_t$ to the integrated trend deltas $e_t(t)$ 226 in order to amplify the trend control signal $c_t(t)$ 230.

In some cases, an animation can exhibit high short-term jitter but is still stable over the long term. For example, a game that is not performance-limited but that uses imprecise frame rate timing may display this behavior. To avoid unnecessarily increasing CPU 102 performance for these cases, a linkage can exist between the jitter and trend controllers. More specifically, if the trend control effort is below some small value epsilon, a jitter value of zero (instead of the actual measured jitter sample) is supplied to the jitter delta term calculator, which has the effect of forcing the jitter loop to unwind so long as the trend loop is also unwound.

As noted above, max-selector 232 is configured to output a maximum of jitter control signal $c_j(t)$ 214, or trend control signal $c_t(t)$ 230, as a power management control signal 234 to power manager 114. In turn, power manager 114 scales the voltage and/or frequency of CPU 102 according to power management control signal 234. Accordingly, monitor 112 enables the performance of CPU 102 to scale dynamically in order to reduce or eliminate choppiness in the NFPS being input to frame buffer 108, thereby providing energy savings and enhancing overall user experience.

Notably, at some point, most animations stop. Accordingly, embodiments of the invention incorporate a threshold amount of time after observing the last frame buffer 108 update (e.g., tens or hundreds of milliseconds). If no new update arrives in that time, the integrators are reset (and, therefore, the control efforts) to zero. As a result, shortly after an animation ends, the UI control loop will cease to have an influence on the operating mode of CPU 102.

Figure 2B:
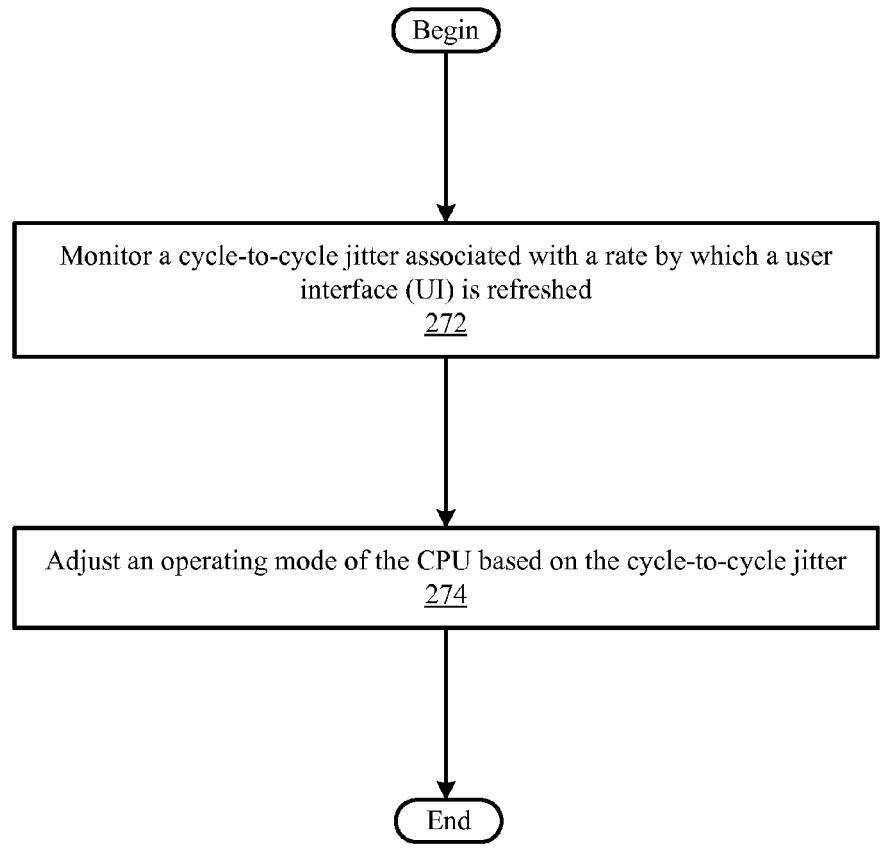
FIG. 2B illustrates a method for updating an operating mode of a CPU based on monitoring a cycle-to-cycle jitter associated with a rate by which a user interface (UI) is refreshed, according to one embodiment of the invention.

FIG. 2B illustrates a method 270 for updating an operating mode of CPU 102 based on monitoring a cycle-to-cycle jitter associated with a rate by which a user interface (UI) is refreshed, according to one embodiment of the invention. Although the method steps 270 are described in conjunction with FIGS. 1 and 2A, persons skilled in the art will understand that any system configured to perform the method steps, in any order, is within the scope of the invention.

As shown in FIG. 2B, the method 270 begins at step 272, which monitors a cycle-to-cycle jitter associated with a rate by which a user interface (UI) is refreshed. At step 274, monitor 112 adjusts an operating mode of the CPU based on the cycle-to-cycle jitter.

Figure 2C:
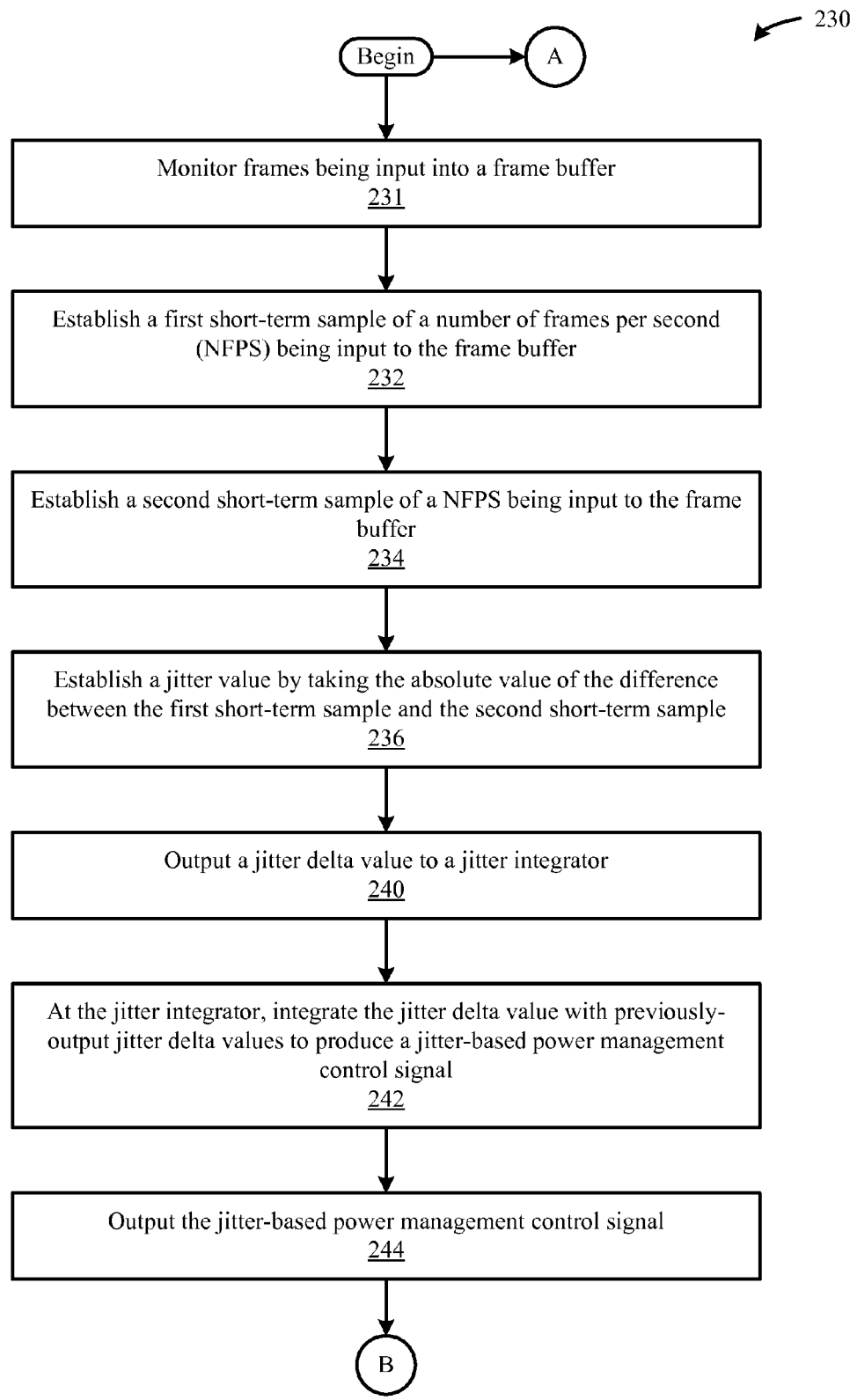
FIGS. 2C-2E illustrate a method for scaling the voltage and/or frequency of a CPU based on the NFPS being input to a frame buffer, according to one embodiment of the invention.
Figure 2D:
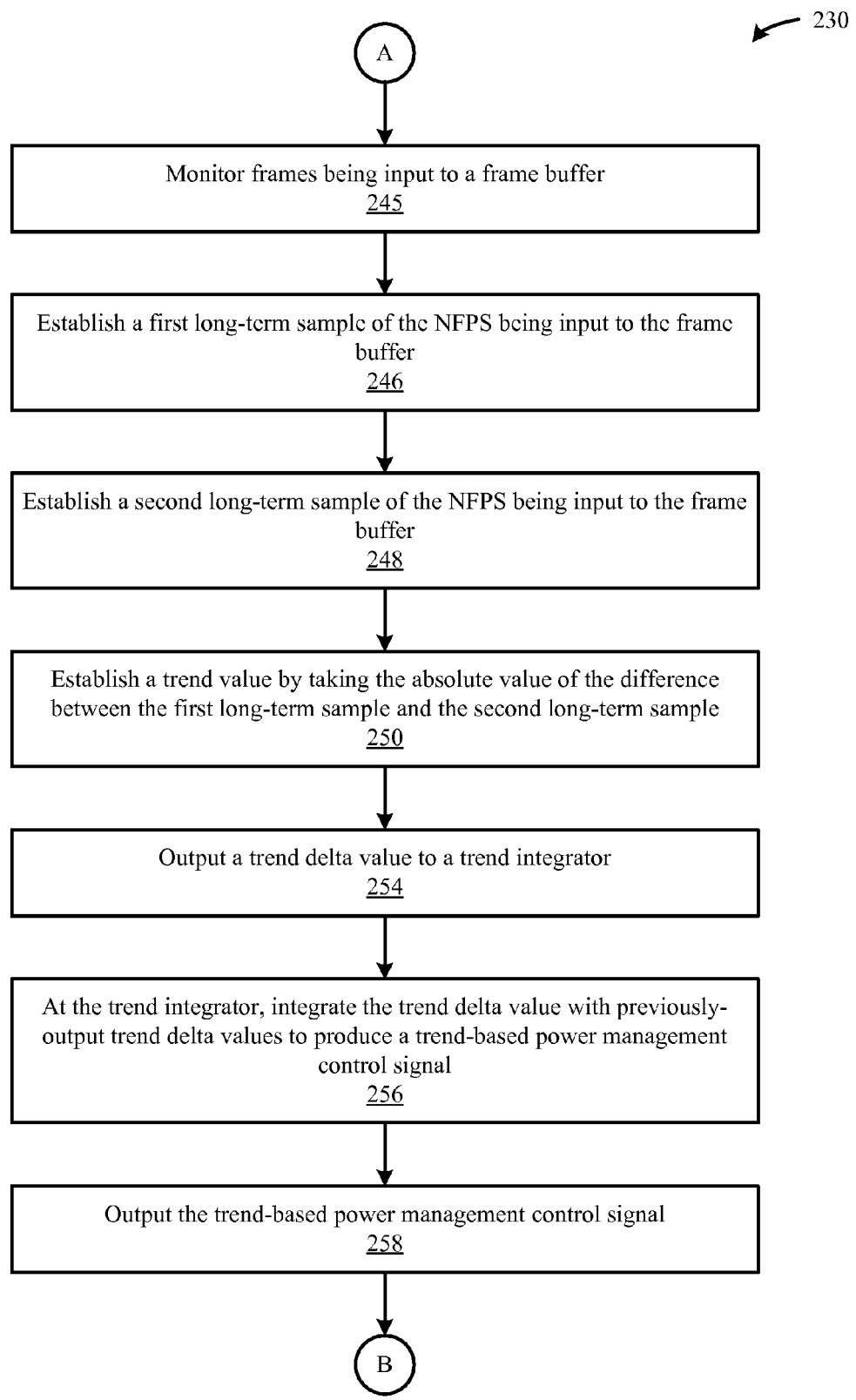
Figure 2E:
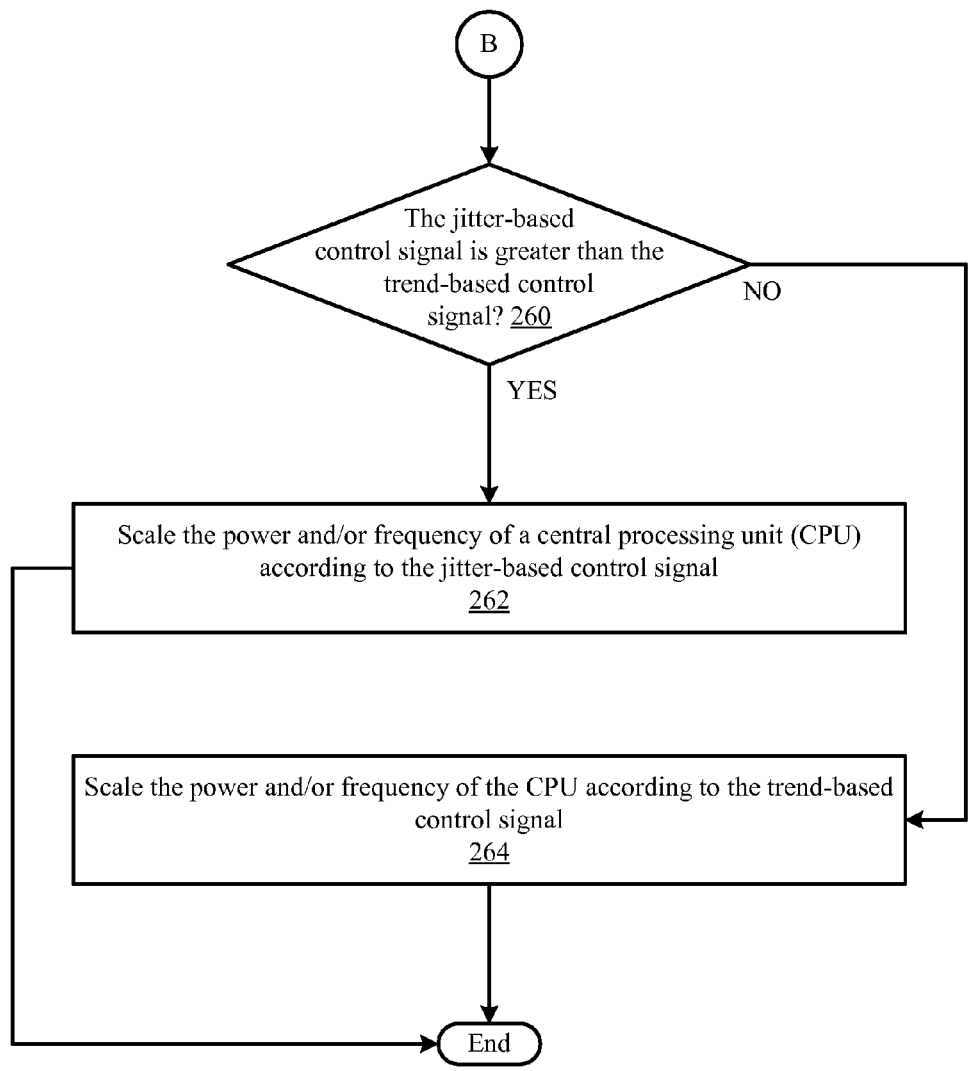

FIGS. 2C-2E illustrate a method 230 for scaling the voltage and/or frequency of CPU 102 based on the NFPS being input to frame buffer 108, according to one embodiment of the invention. Although the method steps 230 are described in conjunction with FIGS. 1 and 2A, persons skilled in the art will understand that any system configured to perform the method steps, in any order, is within the scope of the invention.

As shown in FIG. 2C, the method 230 begins at step 231, where monitor 112 is configured to monitor frames being input into the frame buffer 108. At step 232, monitor 112 establishes a first short-term sample of a NFPS being input into the frame buffer 108. At step 234, monitor 112 establishes a second short-term sample of the NFPS being input into the frame buffer 108. At step 236, monitor 112 establishes a jitter value by taking the absolute value of the difference between the first short-term sample and the second short-term sample. Notably, steps 231-236 represent jitter component 204 described above in conjunction with FIG. 2A.

At step 240, monitor 112 outputs a jitter delta value to a jitter integrator. At step 242, monitor 112 integrates, at the jitter integrator, the jitter delta value with previously-output jitter delta values to produce a jitter-based power management control signal. At step 244, monitor 112 outputs the jitter-based power management control signal.

Figure 4A:
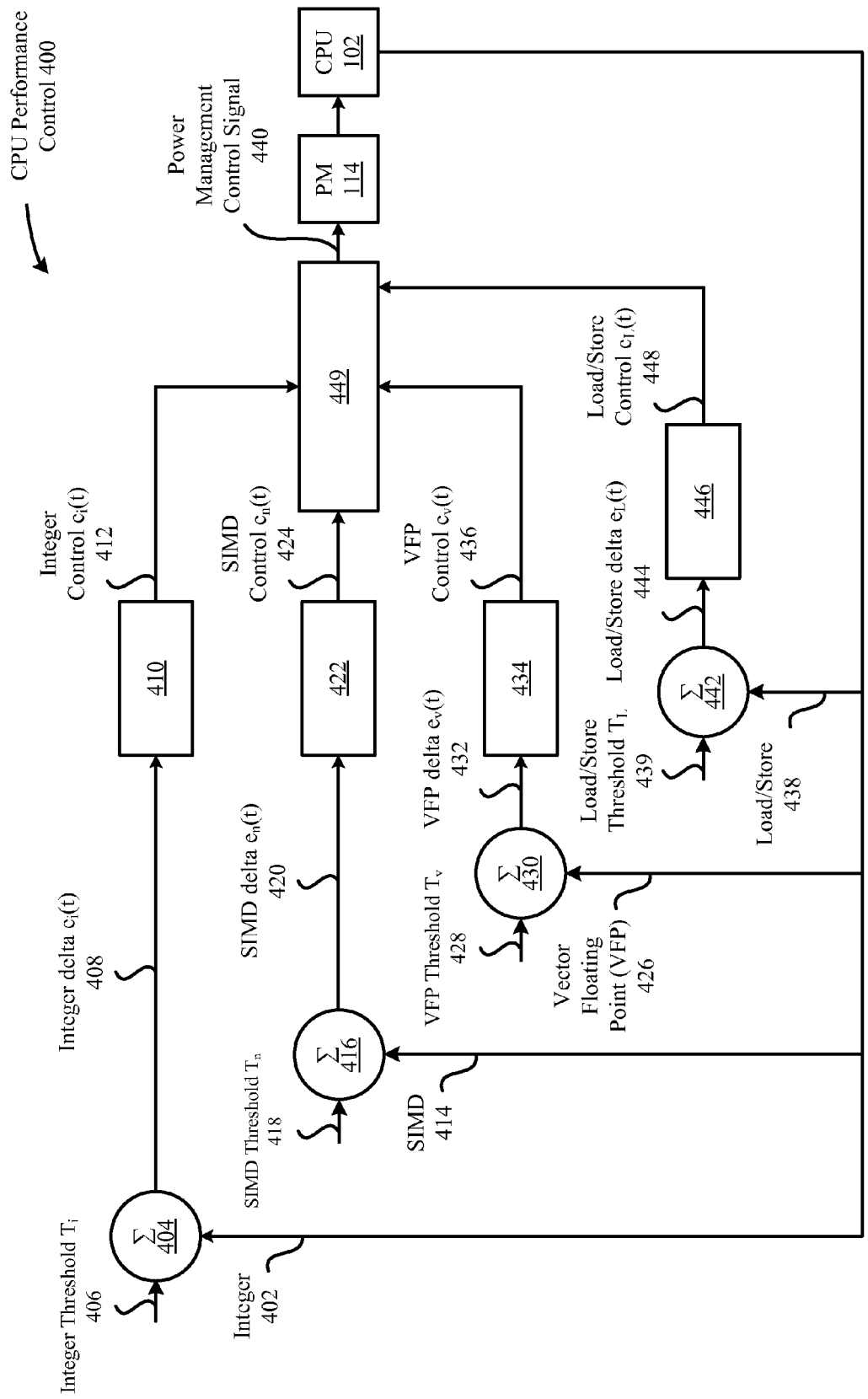
FIG. 4A illustrates a conceptual diagram of an embodiment directed to analyzing the rate at which certain types of instructions are being executed by a CPU and scaling the voltage and/or frequency of the CPU based on the rate.
Figure 4B:
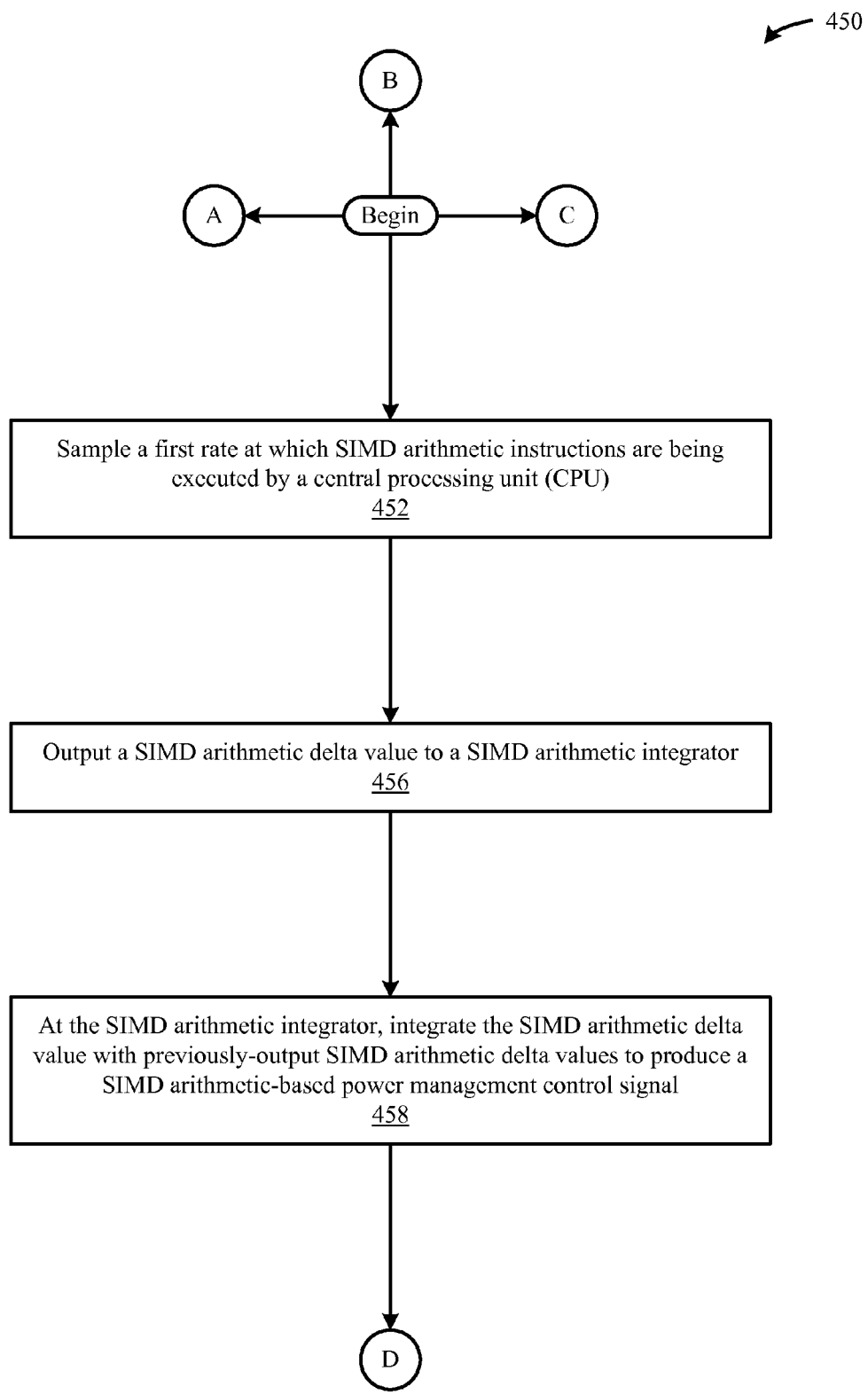
FIGS. 4B-4E illustrate a method for analyzing the rate at which certain types of instructions are being executed by a CPU and scaling the voltage and/or frequency of the CPU based on the rate, according to one embodiment of the invention.
Figure 4C:
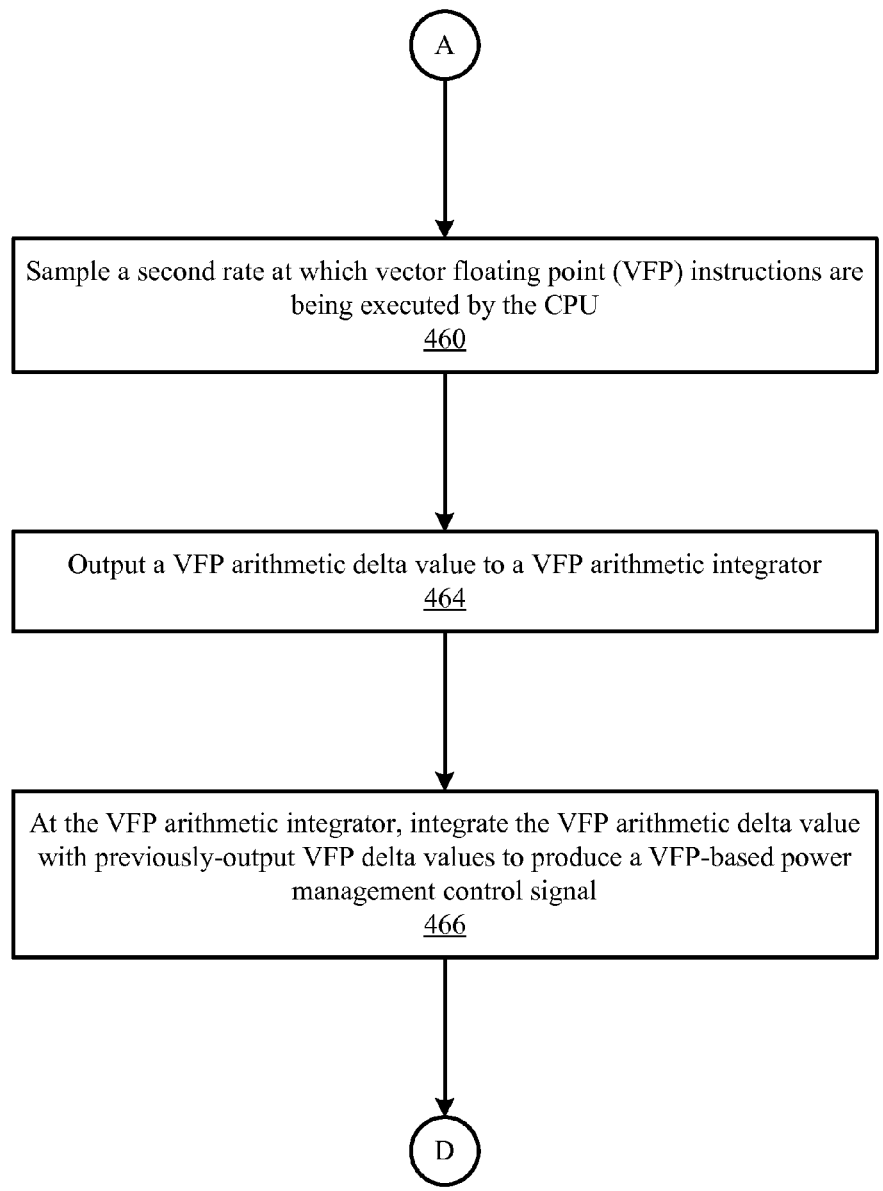
Figure 4D:
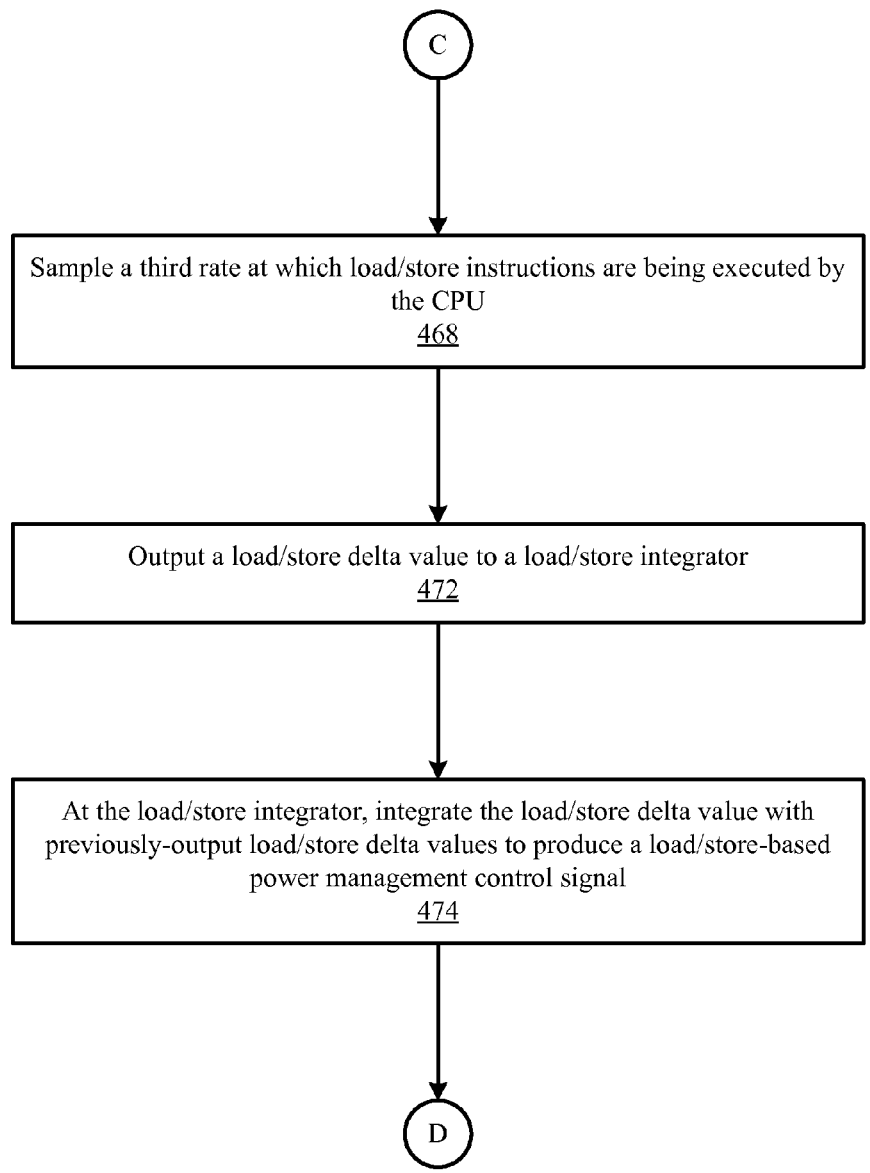

At step 245, which is illustrated in FIG. 4D, monitor 112 monitors frames being input into the frame buffer 108. At step 246, monitor 112 establishes a first long-term sample of the NFPS being input to the frame buffer 108. At step 248, monitor 112 establishes a second long-term sample of the NFPS being input to the frame buffer 108. At step 250, monitor 112 establishes a trend value by taking the absolute value of the difference between the first long-term sample and the second long-term sample. Notably, steps 245-250 represent long-term sample 216, long-term sample 218, and comparator 220 described above in conjunction with FIG. 2A.

At step 254, monitor 112 outputs a trend delta value to a trend integrator. At step 256, monitor 112 integrates, at the trend integrator, the trend delta value with previously-output trend delta values to produce a trend-based power management control signal. At step 258, monitor 112 outputs the trend-based power management control signal.

Turning now to FIG. 2E, at step 260, monitor 112 determines whether the jitter-based control signal is greater than the trend-based control signal. Notably, step 260 represents max-selector 232 described above in conjunction with FIG. 2A. If, at step 260, monitor 112 determines that the jitter-based control signal is greater than the trend-based control signal, then the method 230 proceeds to step 262, where monitor 112 scales the power and/or frequency of CPU 102 according to the jitter-based control signal. Otherwise, the method 230 proceeds to step 264, where monitor 112 scales the power and/or frequency of CPU 102 according to the trend-based control signal.

Figure 3A:
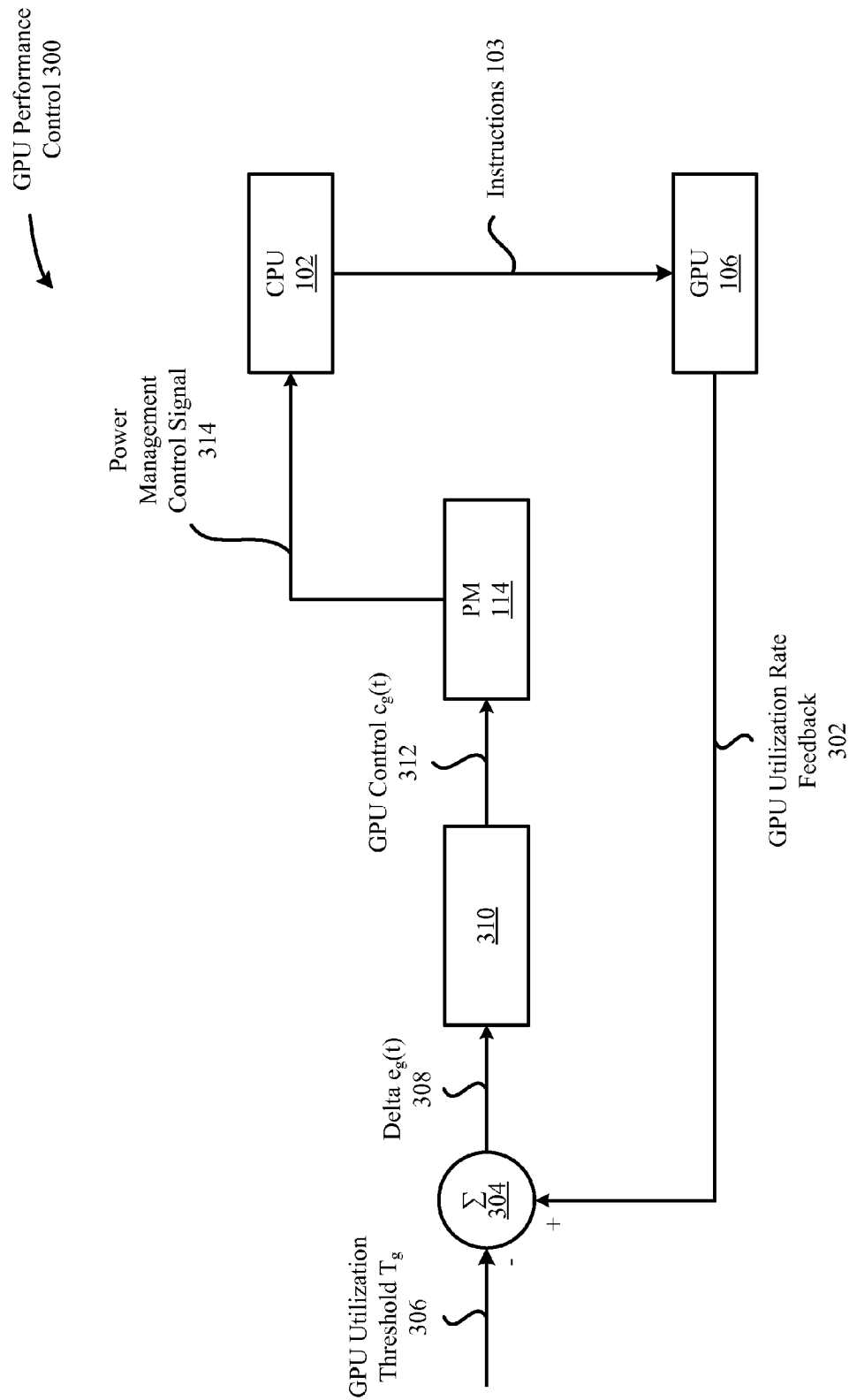
FIG. 3A illustrates a conceptual diagram of an embodiment directed to scaling the voltage and/or frequency of a CPU based on a utilization rate of a GPU.

FIG. 3A illustrates a conceptual diagram 300 of the embodiment directed to scaling the power and/or frequency of CPU 102 based on the utilization rate of GPU 106. As shown in FIG. 3A, the conceptual diagram 300 includes a single loop that is directed to analyzing the utilization rate of GPU 106. In particular, GPU 106 provides GPU utilization rate feedback 302 to comparator 304, which is configured to compare the GPU utilization rate feedback 302 to a GPU utilization threshold $T_g$ 306 (e.g., 99%).

If the GPU utilization threshold $T_g$ 306 is exceeded by the GPU utilization rate feedback 302, then comparator 304 outputs a delta $e_g(t)$ 308 to control signal generator 310. The control signal generator 310 can be any form of a controller filter that is closed-loop stable. In one embodiment, control signal generator 310 can be an integrator that, in turn, integrates deltas $e_g(t)$ 308 as they are output by comparator 304 and outputs a GPU control signal $c_g(t)$ 312 to power manager 114. Control signal generator 310 can be configured to apply a gain $K_g$ to the integrated deltas $e_g(t)$ 308 in order to amplify the power management control signal 314. In turn, power manager 114 receives the power management control signal 314 and accordingly scales the power and/or frequency of CPU 102. In this manner, the performance of CPU 102 scales with the utilization rate of GPU 106 so that CPU 102 is able to issue instructions at a rate that is commensurate with the rate at which GPU 106 is consuming the instructions. As a result, bottlenecks that often occur between CPU 102 and GPU 106 are reduced or eliminated, thereby enhancing overall performance of mobile computing device 100 and ensuring that the full potential of GPU 106 is not hindered by lack of CPU 102 performance.

Figure 3B:
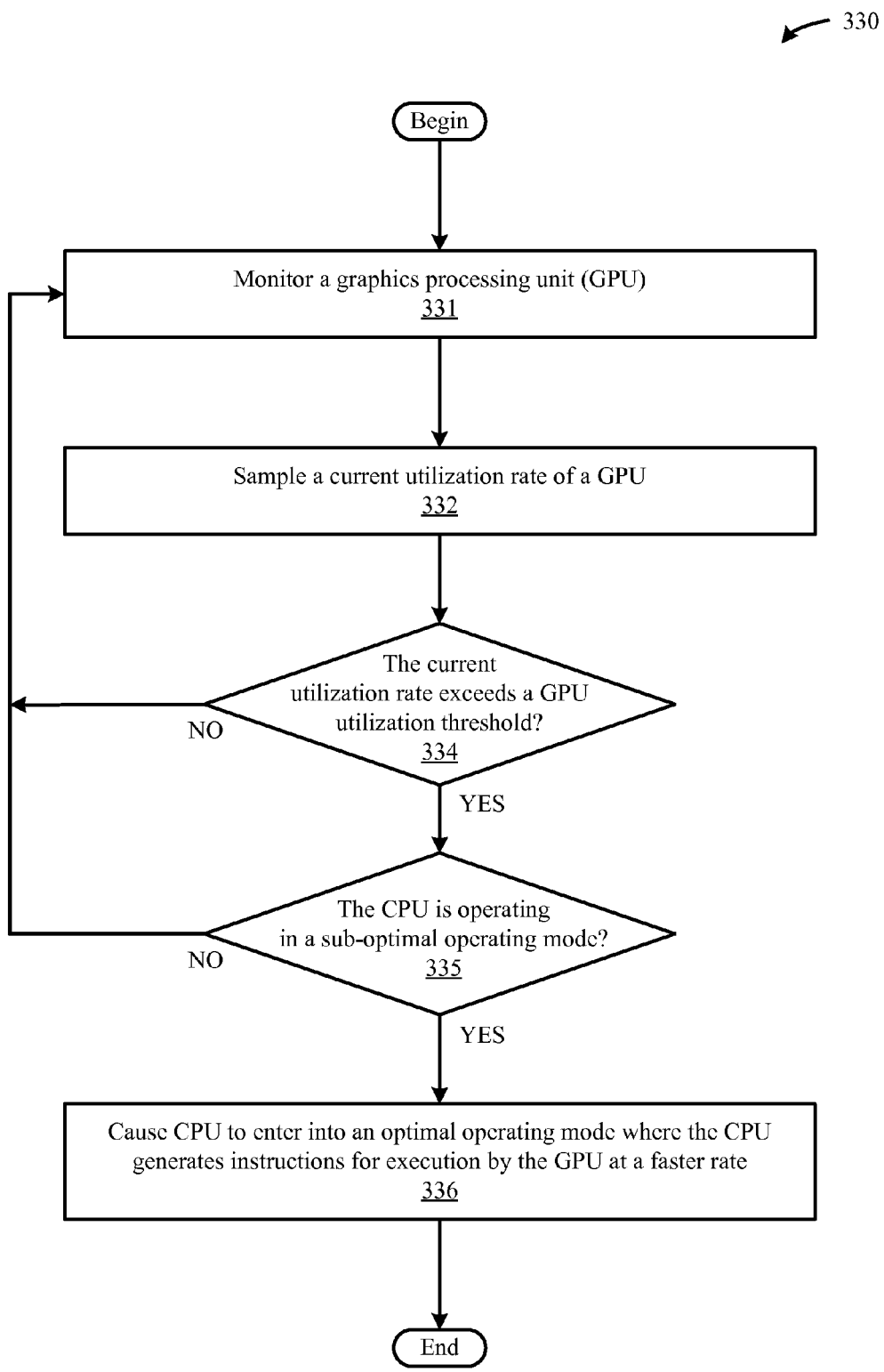
FIG. 3B illustrates a method for entering a CPU into an optimal operating mode based on a utilization rate of a GPU, according to one embodiment of the invention.

FIG. 3B illustrates a method 330 for entering CPU 102 into an optimal operating mode based on a utilization rate of GPU 106, according to one embodiment of the invention. Although the method steps 330 are described in conjunction with FIGS. 1 and 3A, persons skilled in the art will understand that any system configured to perform the method steps, in any order, is within the scope of the invention.

As shown in FIG. 3B, the method 330 begins at step 331, where monitor 112 is configured to monitor the output of GPU 106. At step 332, monitor 112 samples a current utilization rate of GPU 106. At step 334, monitor 112 determines whether the current utilization rate exceeds a GPU utilization threshold. If, at step 334, monitor 112 determines that the current utilization rate exceeds the GPU utilization threshold, then the method 330 proceeds to step 335. At step 335, monitor 112 determines whether CPU 102 is operating in a sub-optimal operating mode. If, at step 335, monitor 112 determines that CPU 102 is operating in a sub-optimal operating mode, then the method 330 proceeds to step 336. Otherwise, the method 330 proceeds back to step 331, where steps 331-335 are repeated until the current utilization rate exceeds the GPU utilization threshold and CPU 102 is operating in a sub-optimal operating mode. At step 336, monitor 112 causes CPU 102 to enter into an optimal operating mode where CPU 102 generates instructions for execution by GPU 106 at a faster rate.

Figure 3C:
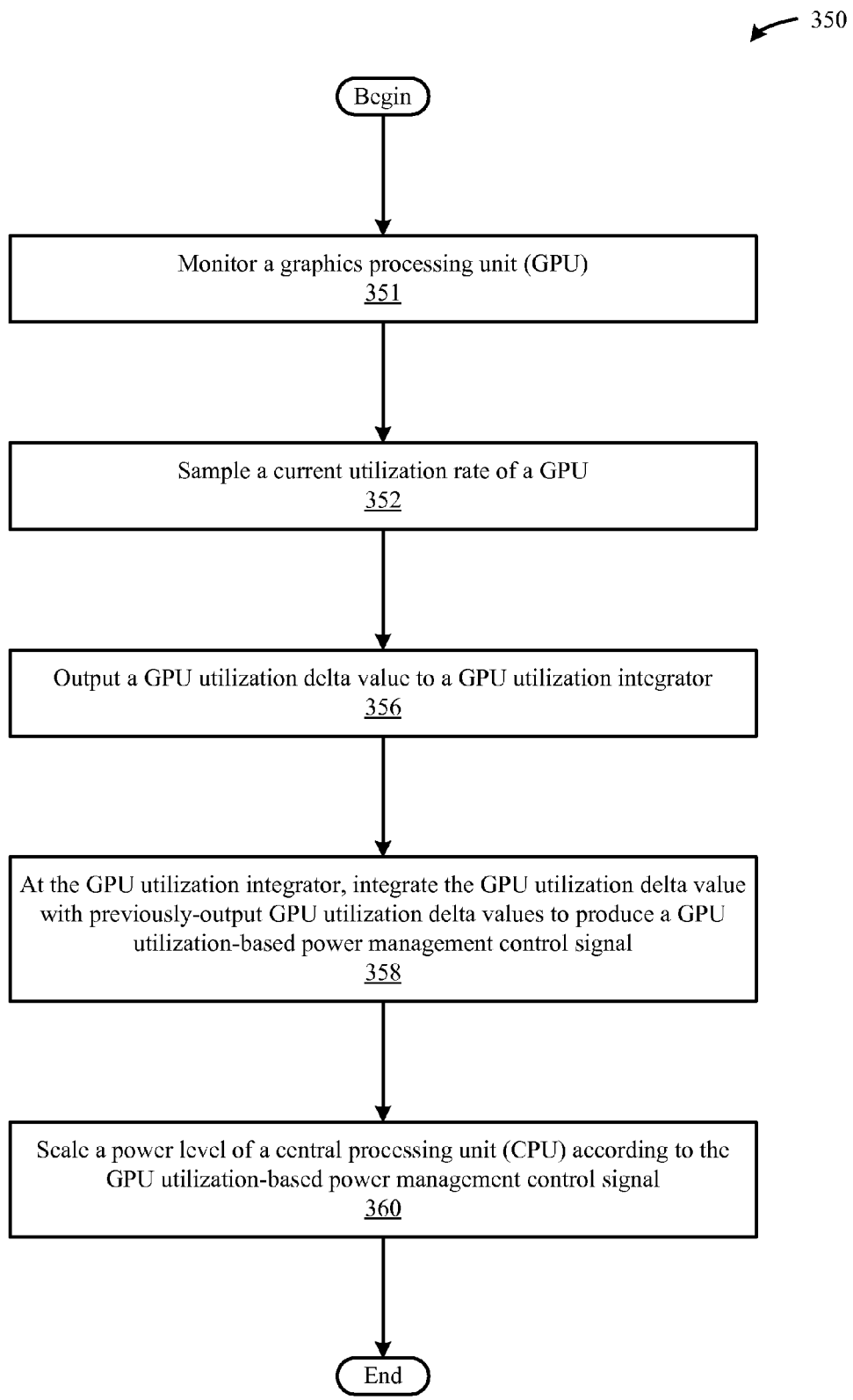
FIG. 3C illustrates a method for scaling the power and/or frequency of a CPU based on a utilization rate of a GPU, according to one embodiment of the invention.

FIG. 3C illustrates a method 350 for scaling the power and/or frequency of CPU 102 based on the utilization rate of GPU 106, according to one embodiment of the invention. Although the method steps 350 are described in conjunction with FIGS. 1 and 3A, persons skilled in the art will understand that any system configured to perform the method steps, in any order, is within the scope of the invention.

As shown in FIG. 3C, the method 350 begins at step 351, where monitor 112 is configured to monitor the output of GPU 106. At step 352, monitor 112 samples a current utilization rate of GPU 106. At step 356, monitor 112 outputs a GPU utilization delta value to a GPU utilization integrator. Notably, steps 351-356 represent comparator 304 and control signal generator 310 described above in conjunction with FIG. 3A. At step 358, monitor 112 integrates, at the GPU utilization integrator, the GPU utilization delta value with previously-output GPU utilization delta values to produce a GPU utilization-based power management control signal. At step 360, monitor 112 scales the power and/or frequency of CPU 102 according to the GPU utilization-based power management control signal.

FIG. 4A illustrates a conceptual diagram 400 of the embodiment directed to analyzing the rate at which certain types of instructions are being executed by CPU 102 and scaling the power and/or frequency of CPU 102 based on the rate. As shown in FIG. 4A, monitor 112 analyzes the rate at which four specific types of instructions are being executed: integer arithmetic instructions 402 (the outermost loop), SIMD arithmetic instructions 414 (the second outermost loop), VFP instructions 426 (the third outermost loop), and load/store instructions 438 (the innermost loop). Workloads exhibiting high instruction-per-cycle densities of these instruction types are often well-optimized and can benefit from increases in the power and/or frequency of CPU 102.

Beginning with the outermost loop, the integer arithmetic instructions 402 are compared at comparator 404 against an integer threshold $T_i$ 406 (e.g., two hundred fifty instructions per cycle). If the integer threshold $T_i$ 406 is exceeded by the rate at which integer arithmetic instructions 402 are being processed by CPU 102, then comparator 404 outputs an integer delta $e_i(t)$ 408 to integer control signal generator 410. The integer control signal generator 410 can be any form of a controller filter that is closed-loop stable. In one embodiment, the integer control signal generator 410 can be an integrator that, in turn, integrates integer deltas $e_i(t)$ 408 as they are output by comparator 404 and outputs an integer control signal $c_i(t)$ 412. Next, the integer control signal $c_i(t)$ 412 is directed to max-selector 449, which, as described in greater detail below, outputs a maximum of the integer control signal $c_i(t)$ 412, a SIMD control signal $c_n(t)$ 424 that is produced according to the second outermost loop of FIG. 4A, a VFP control signal $c_v(t)$ 436 that is produced according to the third outermost loop of FIG. 4A, or a load/store control signal $c_L(t)$ 448 that is produced according to the innermost loop of FIG. 4A.

At the second outermost loop of FIG. 4A, the SIMD arithmetic instructions 414 are compared at comparator 416 against a SIMD threshold $T_n$ 418 (e.g., one hundred fifty instructions per cycle). If the SIMD threshold $T_n$ 418 is exceeded by the rate at which SIMD arithmetic instructions 414 are being processed by CPU 102, then comparator 416 outputs a SIMD delta $e_n(t)$ 420 to SIMD control signal generator 422. The SIMD control signal generator 422 can be any form of a controller filter that is closed-loop stable. In one embodiment, the SIMD control signal generator 422 can be an integrator that, in turn, integrates SIMD deltas $e_n(t)$ 420 as they are output by comparator 416 and outputs the SIMD control signal $c_n(t)$ 424 to max-selector 449.

At the third outermost loop of FIG. 4A, the VFP instructions 426 are compared at comparator 430 against a VFP threshold $T_v$ 428 (e.g., fifty instructions per cycle). If the VFP threshold $T_v$ 428 is exceeded by the rate at which VFP instructions 426 are being processed by CPU 102, then comparator 430 outputs a VFP delta $e_v(t)$ 432 to VFP control signal generator 434. The VFP control signal generator 434 can be any form of a controller filter that is closed-loop stable. In one embodiment, the VFP control signal generator 434 can be an integrator that, in turn, integrates VFP deltas $e_v(t)$ 432 as they are output by comparator 430 and outputs the VFP control signal $c_v(t)$ 436 to max-selector 449.

At the innermost loop of FIG. 4A, the load/store instructions 438 are compared at comparator 442 against a load/store threshold $T_L$ 439. If the load/store threshold $T_L$ 439 is exceeded by the rate at which load/store instructions 438 are being processed by CPU 102, then comparator 442 outputs a load/store delta $e_L(t)$ 444 to load/store control signal generator 446. The load/store control signal generator 446 can be any form of a controller filter that is closed-loop stable. In one embodiment, the load/store control signal generator 446 can be an integrator that, in turn, integrates load/store deltas $e_L(t)$ 444 as they are output by comparator 442 and outputs the load/store control signal $c_L(t)$ 448 to max-selector 449.

As noted above, max-selector 449 is configured to output a maximum of the integer control signal $c_i(t)$ 412, the SIMD control signal $c_n(t)$ 424, the VFP control signal $c_v(t)$ 436, and the load/store control signal $c_L(t)$ 448 as a power management control signal 440 to power manager 114. In turn, power manager 114 scales the power and/or frequency of CPU 102 according to power management control signal 440. Accordingly, monitor 112 enables the performance of CPU 102 to scale dynamically when specific types of instructions that benefit from such a scaling are being executing by CPU 102. Notably, monitor 112 can be further configured to provide similar scaling in response to other types of instructions being executed by CPU 102, such as load/store instructions.

FIGS. 4B-4E illustrate a method 450 for analyzing the rate at which certain types of instructions are being executed by CPU 102 and scaling the voltage and/or frequency of CPU 102 based on the rate, according to one embodiment of the invention. Although the method steps 450 are described in conjunction with FIGS. 1 and 4A, persons skilled in the art will understand that any system configured to perform the method steps, in any order, is within the scope of the invention.

As shown in FIG. 4B, the method 450 begins at step 452, where monitor 112 samples a first rate at which SIMD instructions are being executed by a central processing unit (CPU). At step 456, monitor 112 outputs a SIMD delta value to a SIMD arithmetic integrator. At step 458, monitor 112 integrates, at the SIMD arithmetic integrator, the SIMD arithmetic delta value with previously-output SIMD arithmetic delta values to produce a SIMD arithmetic-based power management control signal.

Turning now to FIG. 4C, at step 460, monitor 112 samples a second rate at which vector floating point (VFP) instructions are being executed by CPU 102. At step 464, monitor 112 outputs a VFP arithmetic delta value to a VFP arithmetic integrator. At step 466, monitor 112 integrates, at the VFP arithmetic integrator, the VFP arithmetic delta value with previously-output VFP delta values to produce a VFP-based power management control signal.

Turning now to FIG. 4D, at step 468, monitor 112 samples a third rate at which load/store instructions are being executed by CPU 102. At step 472, monitor 112 outputs a load/store delta value to a load/store integrator. At step 474, monitor 112 integrates, at the load/store integrator, the load/store delta value with previously-output load/store delta values to produce a load/store-based power management control signal.

Figure 4E:
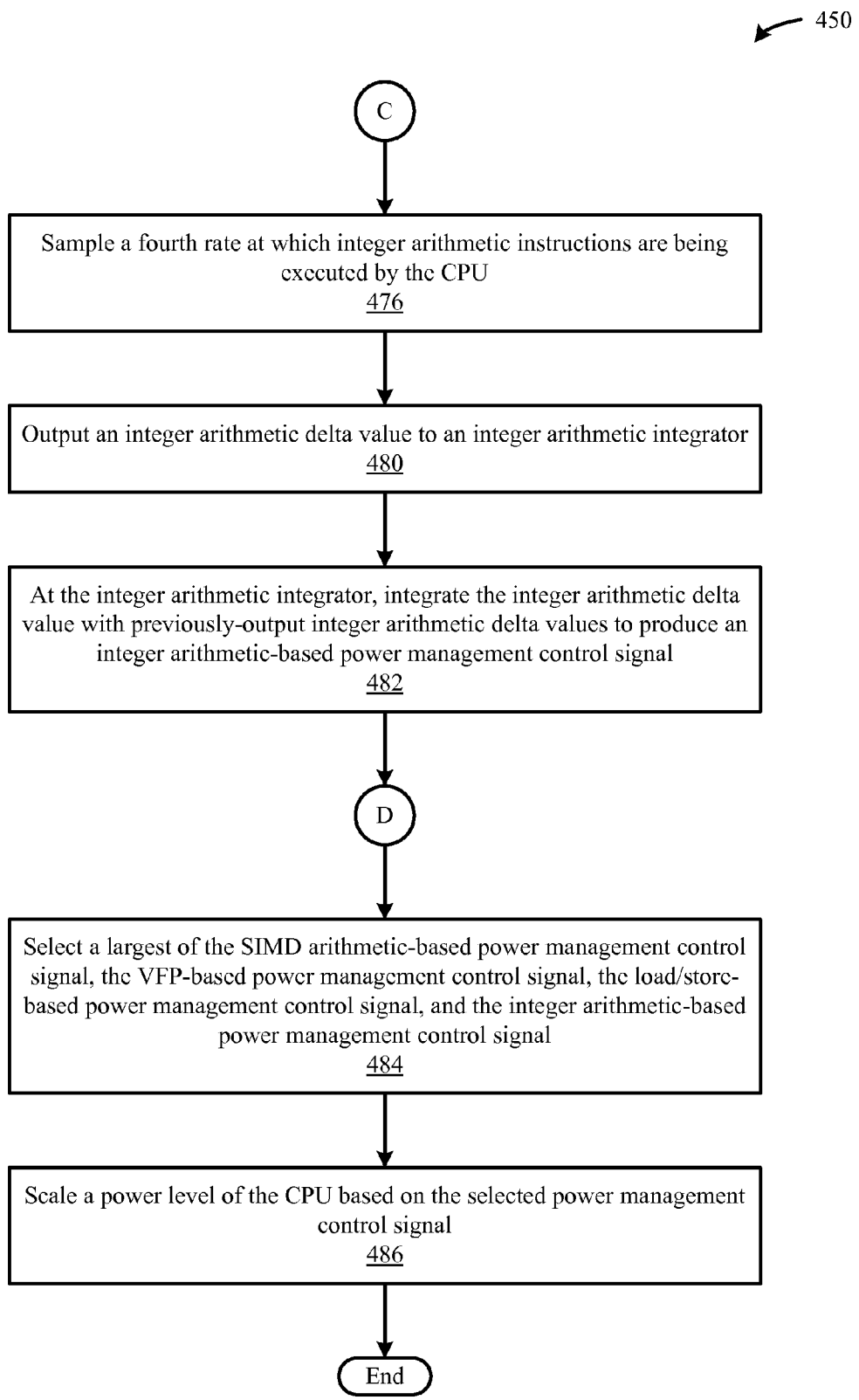

Turning now to FIG. 4E, at step 476, monitor 112 samples a fourth rate at which integer arithmetic instructions are being executed by CPU 102. At step 480, monitor 112 outputs an integer arithmetic delta value to an integer arithmetic integrator. At step 482, monitor 112 integrates, at the integer arithmetic integrator, the integer arithmetic delta value with previously-output integer arithmetic delta values to produce an integer arithmetic-based power management control signal.

At step 484, monitor 112 selects a largest of the SIMD arithmetic-based power management control signal, the VFP-based power management control signal, and the integer arithmetic-based power management control signal. At step 486, monitor 112 scales a power level of the CPU based on the selected power management control signal.

As previously noted herein, embodiments of the invention also include a method for optimizing operations of the CPU 102 where the CPU 102 is configured to perform transactions with the memory controller 103 that manages access to a DRAM and a flash memory. According to one embodiment, memory controller 103 is configured to separately measure the throughput of traffic to and from the CPU 102 and also separately measure the throughput of traffic to and from the flash memory subsystem. This technique provides increased CPU 102 performance for high-throughput data transaction workloads, e.g., video encoding and high-performance photography. Once memory activity exceeds the relevant threshold(s), CPU performance is elevated.

Figure 5A:
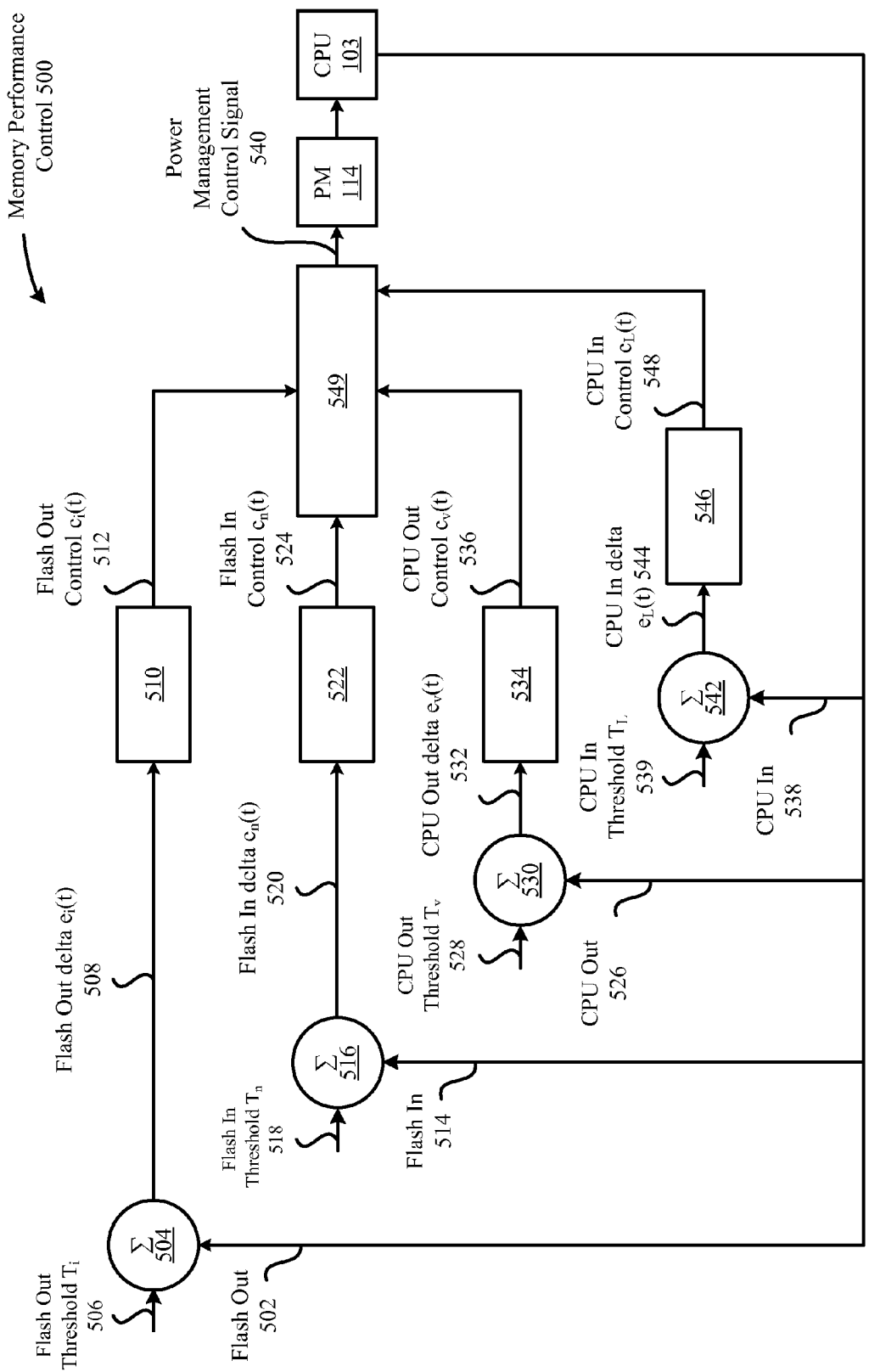
FIG. 5A illustrates a conceptual diagram of an embodiment directed to analyzing a rate at which a CPU performs transactions with a memory controller that manages access to a DRAM and a flash memory, according to one embodiment of the invention.

FIG. 5A illustrates a conceptual diagram of an embodiment directed to analyzing a rate at which the CPU 102 performs transactions with the memory controller 103, according to one embodiment of the invention. As shown in FIG. 5A, monitor 112 analyzes the throughput of traffic to and from the CPU and also the throughput of traffic to and from the flash memory subsystem, which is represented in FIG. 5A as: flash memory OUT 502 (the outermost loop), flash memory IN 514 (the second outermost loop), CPU OUT 526 (the third outermost loop), and CPU IN 538 (the innermost loop), respectively.

Beginning with the outermost loop, flash memory OUT 502 is compared at comparator 504 against a flash memory OUT threshold $T_i$ 506. If flash memory OUT threshold $T_i$ 506 is exceeded by the rate of flash memory OUT 502, then comparator 504 outputs a flash memory OUT delta $e_i(t)$ 508 to flash memory OUT control signal generator 510. The flash memory OUT control signal generator 510 can be any form of a controller filter that is closed-loop stable. In one embodiment, the flash memory OUT control signal generator 510 can be an integrator that, in turn, integrates flash memory OUT deltas $e_i(t)$ 508 as they are output by comparator 504 and outputs a flash memory OUT control signal $c_i(t)$ 512. Next, the flash memory OUT control signal $c_i(t)$ 512 is directed to max-selector 549, which, as described in greater detail below, outputs a maximum of the flash memory OUT control signal $c_i(t)$ 512, a flash memory IN control signal $c_n(t)$ 524 that is produced according to the second outermost loop of FIG. 5A, a CPU OUT control signal $c_v(t)$ 536 that is produced according to the third outermost loop of FIG. 5A, or a CPU IN control signal $c_L(t)$ 548 that is produced according to the innermost loop of FIG. 5A.

At the second outermost loop of FIG. 5A, flash memory IN 514 is compared at comparator 516 against a flash memory IN threshold $T_n$ 518. If flash memory IN threshold $T_n$ 518 is exceeded by the rate of flash memory IN 514, then comparator 516 outputs a flash memory IN delta $e_n(t)$ 520 to flash memory IN control signal generator 522. The flash memory IN control signal generator 522 can be any form of a controller filter that is closed-loop stable. In one embodiment, the flash memory IN control signal generator 522 can be an integrator that, in turn, integrates flash memory IN deltas $e_n(t)$ 520 as they are output by comparator 516 and outputs the flash memory IN control signal $c_n(t)$ 524 to max-selector 549.

At the third outermost loop of FIG. 5A, CPU OUT 526 is compared at comparator 530 against a CPU OUT threshold $T_v$ 528. If CPU OUT threshold $T_v$ 528 is exceeded by the rate of CPU OUT 526, then comparator 530 outputs a CPU OUT delta $e_v(t)$ 532 to CPU OUT control signal generator 534. The CPU OUT control signal generator 534 can be any form of a controller filter that is closed-loop stable. In one embodiment, the CPU OUT control signal generator 534 can be an integrator that, in turn, integrates CPU OUT deltas $e_v(t)$ 532 as they are output by comparator 530 and outputs the CPU OUT control signal $c_v(t)$ 536 to max-selector 549.

At the innermost loop of FIG. 5A, CPU IN 538 is compared at comparator 542 against a CPU IN threshold $T_L$ 539. If CPU IN threshold $T_L$ 539 is exceeded by the rate of CPU IN 538, then comparator 542 outputs a CPU IN delta $e_L(t)$ 544 to CPU IN control signal generator 546. The CPU IN control signal generator 546 can be any form of a controller filter that is closed-loop stable. In one embodiment, the CPU IN control signal generator 546 can be an integrator that, in turn, integrates CPU IN deltas $e_L(t)$ 544 as they are output by comparator 542 and outputs the CPU IN control signal $c_L(t)$ 548 to max-selector 549.

As noted above, max-selector 549 is configured to output a maximum of the flash memory OUT control signal $c_i(t)$ 512, the flash memory IN control signal $c_n(t)$ 524, the CPU OUT control signal $c_v(t)$ 536, and the CPU IN control signal $c_L(t)$ 548 as a power management control signal 540 to power manager 114. In turn, power manager 114 scales the power and/or frequency of CPU 102 according to power management control signal 540. Accordingly, monitor 112 enables the performance of CPU 102 to scale dynamically when executing high-throughput data transaction workloads, e.g., video encoding and high-performance photography.

Figure 5B:
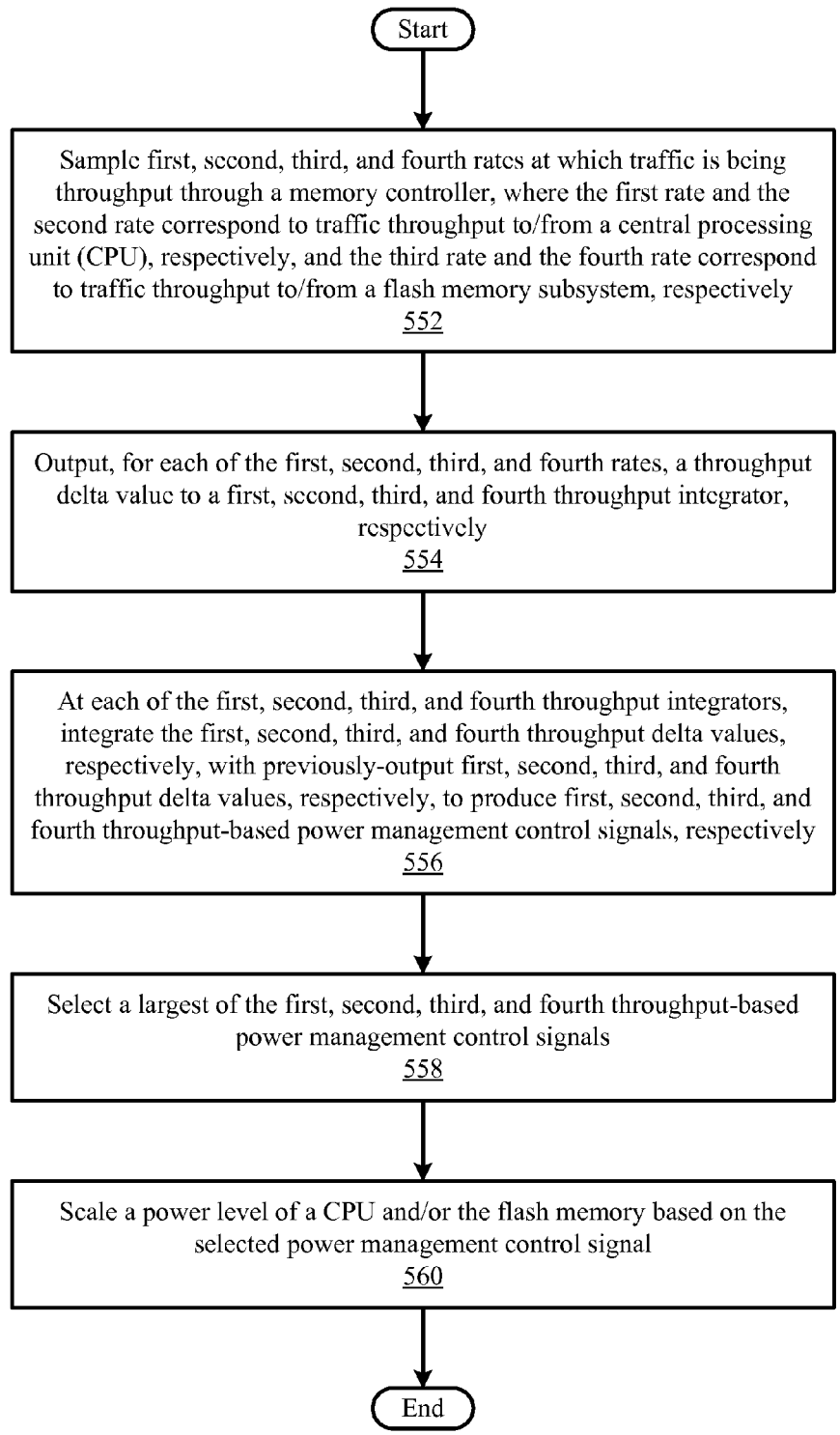
FIG. 5B illustrates a method for optimizing operations of a CPU in a mobile computing device having the CPU configured to perform transactions with a memory controller that manages access to a DRAM and a flash memory, according to one embodiment of the invention.

FIG. 5B illustrates a method 550 for optimizing operations of CPU 102 when CPU 102 is configured to perform transactions with memory controller 103 and memory controller 103 is configured to manage access to a DRAM and a flash memory, according to one embodiment of the invention. As shown, the method 550 begins at step 552, where monitor 112 samples first, second, third, and fourth rates at which traffic is being throughput through a memory controller, where the first rate and the second rate correspond to traffic throughput to/from the CPU 102, respectively, and the third rate and the fourth rate correspond to traffic throughput to/from a flash memory subsystem, respectively.

At step 554, monitor 112 outputs, for each of the first, second, third, and fourth rates, a throughput delta value to a first, second, third, and fourth throughput integrator, respectively. At step 556, monitor 112, at each of the first, second, third, and fourth throughput integrators, integrate the first, second, third, and fourth throughput delta values, respectively, with previously-output first, second, third, and fourth throughput delta values, respectively, to produce first, second, third, and fourth throughput-based power management control signals, respectively.

At step 558, monitor 112 selects a largest of the first, second, third, and fourth throughput-based power management control signals. At step 560, monitor 112 scales a power level of the CPU 102 on the selected power management control signal.

Figure 6A:
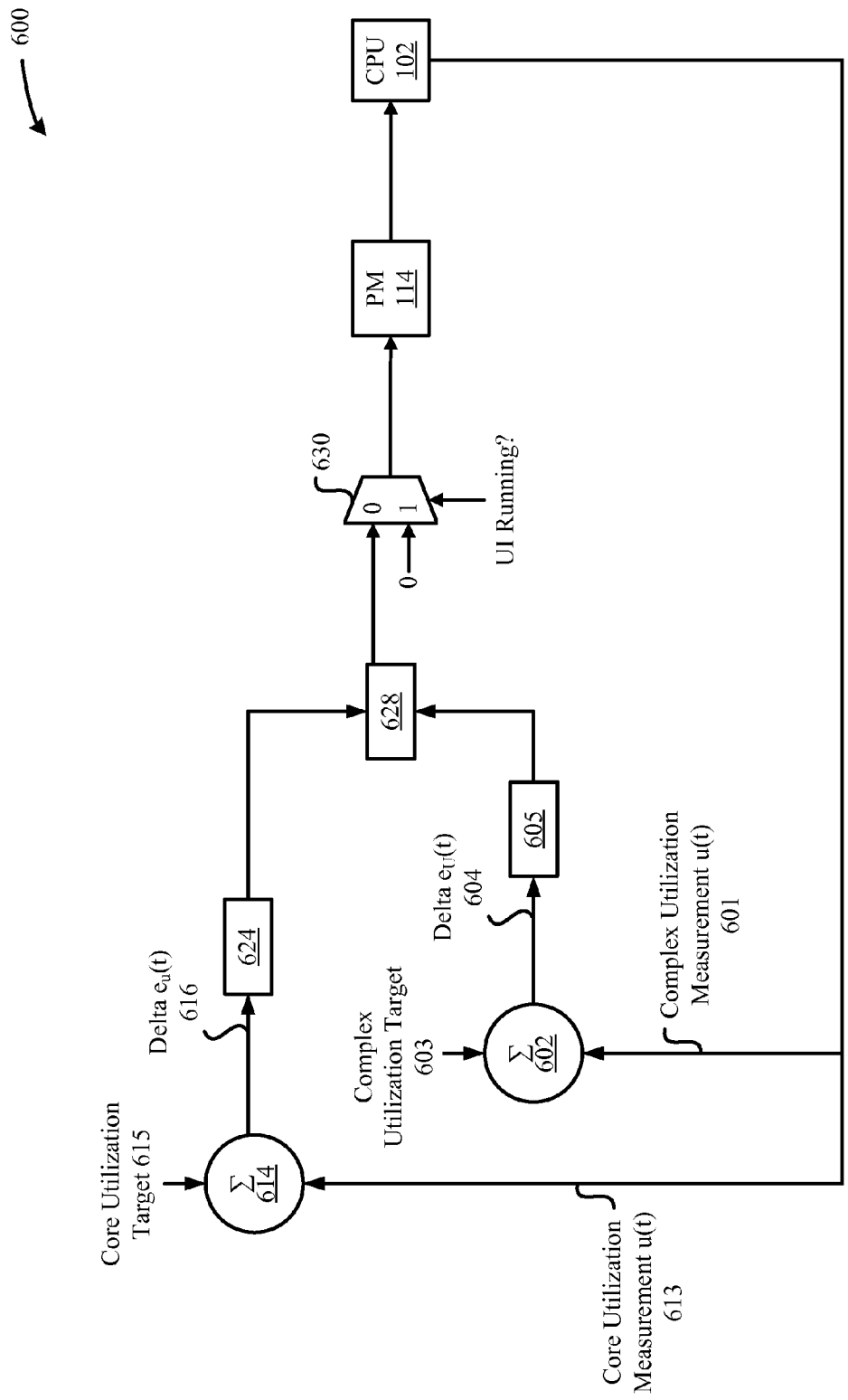
FIG. 6A illustrates a conceptual diagram of an embodiment directed to scaling the voltage and/or frequency of a CPU when the CPU executes workloads that have characteristics of traditional desktop/laptop computer applications, according to one embodiment of the invention.

FIG. 6A illustrates a conceptual diagram 600 of an embodiment directed to scaling the voltage and/or frequency of the CPU 102 when the CPU 102 executes workloads that have characteristics of traditional desktop/laptop computer applications, according to one embodiment of the invention. In particular, according to this embodiment, the voltage and/or frequency of the CPU 102 is only scaled when the mobile computing device 100 does not appear to be executing a UI-oriented workload. As illustrated in FIG. 6A, the technique involves two control loops, where the first control loop is configured to monitor CPU 102 for a CPU complex (or "package") utilization measurement 601, and where the second control loop is configured to monitor CPU 102 for a core utilization measurement 613.

According to the embodiment illustrated in FIG. 6A, the first control loop involves measuring a fraction of the sample interval in which at least one core of CPU 102 is active. The complex utilization measurement 601 is compared at comparator 602 against a complex utilization target 603 (e.g., 99%), and a delta $e_U(t)$ 604 is output by comparator 602 to an integrator 605. Next, the output of integrator 605 is fed into a max-selector 628, which outputs a maximum of the output of the integrator 605 and an integrator 624 of the second loop (described in greater detail below).

The second control loop involves measuring the duty factor of the cores of the CPU 102 by adding up the time each core spends active. For example, a dual-core CPU 102 would report a utilization of 100% if both of the cores were active throughout an entire sample interval. As shown in FIG. 6A, the core utilization measurement 613 is compared at comparator 614 against a core utilization target 615 (e.g., 90%), and a delta $e_u(t)$ 616 is output by comparator 614 to an integrator 624. Next, the output of integrator 624 is fed into the max-selector 628, which, as noted above, outputs a maximum of the output of the integrator 605 and the integrator 624. Finally, component 630 takes into account whether or not a threshold NFPS are being input into the frame buffer 108. In particular, if a threshold NFPS (e.g., 15 FPS) are being input into the frame buffer 108, then the output of the max-selector 628 is not fed into the power manager 114; otherwise, the output of the max-selector 628 is fed into the power manager 114, and the voltage and/or frequency of the CPU 102 is scaled according to the output of the max-selector 628.

Figure 6B:
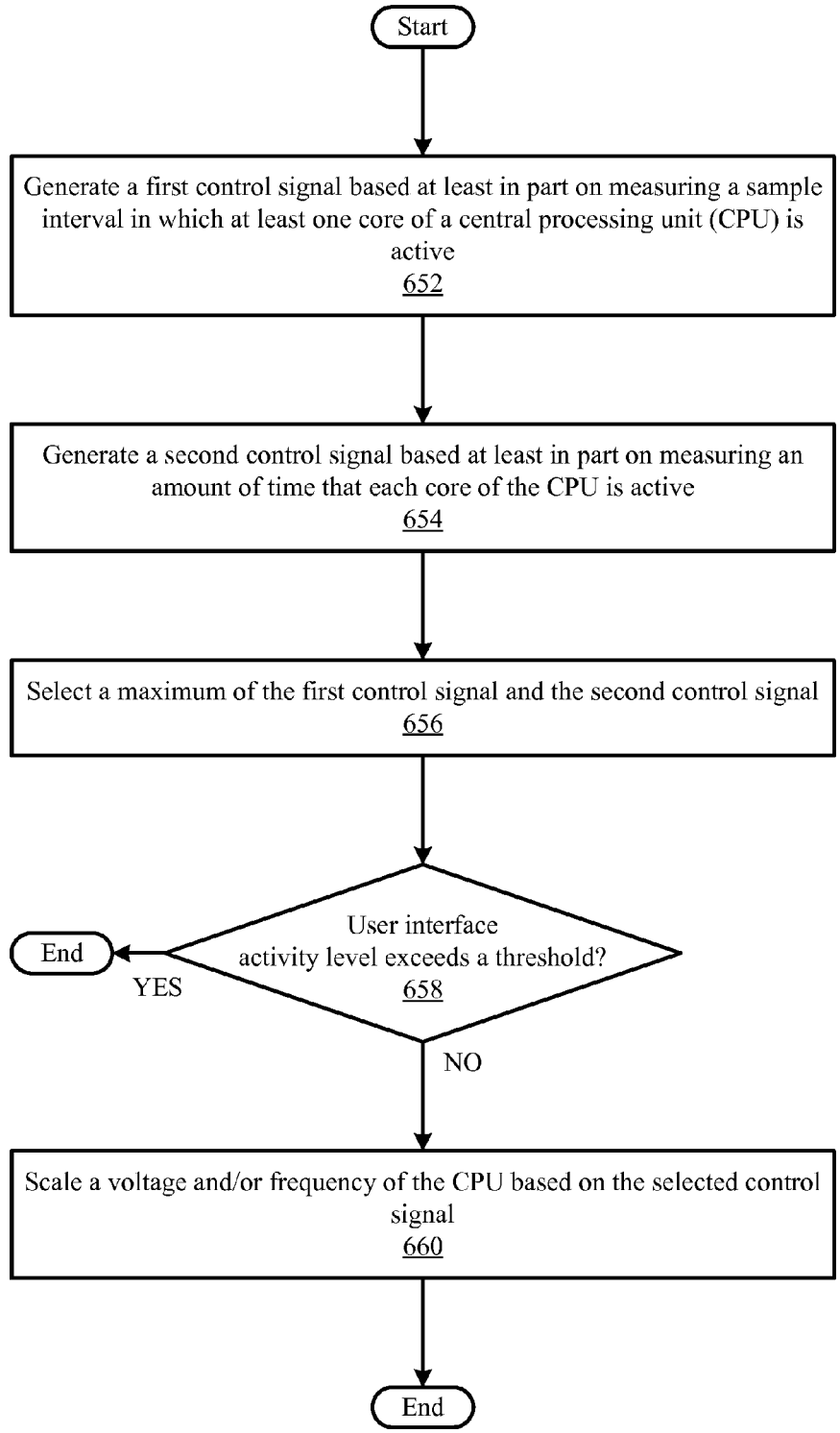
FIG. 6B illustrates a method for scaling the voltage and/or frequency of a CPU when the CPU executes workloads that have characteristics of traditional desktop/laptop computer applications, according to one embodiment of the invention.

FIG. 6B illustrates a method 650 for scaling the voltage and/or frequency of a CPU when the CPU executes workloads that have characteristics of traditional desktop/laptop computer applications, according to one embodiment of the invention.

As shown, the method 650 begins at step 652, where monitor 112 generates a first control signal based at least in part on measuring a sample interval in which at least one core of a central processing unit (CPU) is active. At step 654, monitor 112 generates a second control signal based at least in part on measuring an amount of time that each core of the CPU is active. At step 656, monitor 112 selects a maximum of the first control signal and the second control signal. At step 658, monitor 112 determines if a user interface activity level exceeds a threshold (e.g., by monitoring a NFPS being input into the frame buffer 108). If, at step 658, monitor 112 determines that the user interface activity level exceeds the threshold, then method 650 ends; otherwise, at step 660, monitor 112 scales a voltage and/or frequency of the CPU based on the control signal selected at step 656.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for updating an operating mode of a central processing unit (CPU), comprising:
    monitoring a cycle-to-cycle jitter associated with a rate by which a user interface (UI) is refreshed, wherein monitoring the cycle-to-cycle jitter comprises analyzing a rate of change in a number of frames per second (NFPS) being input to a frame buffer associated with the CPU; and
    adjusting the operating mode of the CPU based on the cycle-to-cycle jitter.

2. The method of claim 1, wherein adjusting the operating mode of the CPU comprises adjusting a voltage level and/or a frequency at which the CPU is operating.

3. The method of claim 1, wherein monitoring the cycle-to-cycle jitter comprises establishing:
    a jitter control signal based on short-term sampling of the NFPS being input to the frame buffer; and a trend control signal based on long-term sampling of the NFPS being input to the frame buffer.

4. The method of claim 3, wherein the operating mode of the CPU is adjusted via a control signal that is selected from a maximum of the jitter control signal and the trend control signal.

5. The method of claim 3, further comprising applying a first gain value to the jitter control signal and applying a second gain value to the trend control signal.

6. The method of claim 1, wherein the CPU is included in a mobile computing device.

7. A system, comprising:
a central processing unit (CPU);
a frame buffer; and
a memory storing instructions that, when executed by the CPU, cause the CPU to carry out steps that include:
monitoring a cycle-to-cycle jitter associated with a rate by which a user interface (UI) is refreshed, wherein monitoring the cycle-to-cycle jitter comprises analyzing a rate of change in a number of frames per second (NFPS) being input to the frame buffer; and
adjusting an operating mode of the CPU based on the cycle-to-cycle jitter.

8. The system of claim 7, wherein adjusting the operating mode of the CPU comprises adjusting a power level and/or a frequency at which the CPU is operating.

9. The system of claim 7, wherein monitoring the cycle-to-cycle jitter comprises establishing:
a jitter control signal based on short-term sampling of the NFPS being input to the frame buffer; and
a trend control signal based on long-term sampling of the NFPS being input to the frame buffer.

10. The system of claim 9, wherein the jitter control signal and the trend control signal are used to produce a final control signal whose value maps to a particular operating mode of the CPU.

11. The system of claim 10, wherein the value of the final control signal defines a number of cores to be operating within the CPU.

12. The system of claim 9, wherein the operating mode of the CPU is adjusted via a control signal that is selected from a maximum of the jitter control signal and the trend control signal.

13. The system of claim 9, wherein the steps further include applying a first gain value to the jitter control signal and applying a second gain value to the trend control signal.

14. The system of claim 7, wherein the system is a mobile computing device.

15. The method of claim 3, wherein the jitter control signal and the trend control signal are used to produce a final control signal whose value maps to a particular operating mode of the CPU.

16. The method of claim 15, wherein the value of the final control signal defines a number of cores to be operating within the CPU.

17. A non-transitory computer readable storage medium configured to store instructions that, when executed by a central processing unit (CPU) of a computing device that includes a frame buffer, cause the computing device to carry out steps that include:
monitoring a cycle-to-cycle jitter associated with a rate by which a user interface (UI) is refreshed, wherein monitoring the cycle-to-cycle jitter comprises analyzing a rate of change in a number of frames per second (NFPS) being input to the frame buffer; and
adjusting an operating mode of the CPU based on the cycle-to-cycle jitter.

18. The non-transitory computer readable storage medium of claim 17, wherein adjusting the operating mode of the CPU comprises adjusting a power level and/or a frequency at which the CPU is operating.

19. The non-transitory computer readable storage medium of claim 17, wherein monitoring the cycle-to-cycle jitter comprises establishing:
a jitter control signal based on short-term sampling of the NFPS being input to the frame buffer; and
a trend control signal based on long-term sampling of the NFPS being input to the frame buffer.

20. The non-transitory computer readable storage medium of claim 19, wherein the jitter control signal and the trend control signal are used to produce a final control signal whose value maps to a particular operating mode of the CPU.

21. The non-transitory computer readable storage medium of claim 20, wherein the value of the final control signal defines a number of cores to be operating within the CPU.

22. The non-transitory computer readable storage medium of claim 19, wherein the operating mode of the CPU is adjusted via a control signal that is selected from a maximum of the jitter control signal and the trend control signal.

23. The non-transitory computer readable storage medium of claim 19, wherein the steps further include comprising applying a first gain value to the jitter control signal and applying a second gain value to the trend control signal.

24. A method for updating an operating mode of a central processing unit (CPU), comprising:
adjusting the operating mode of the CPU based on a cycle-to-cycle jitter associated with a rate by which a user interface (UI) is refreshed, wherein the cycle-to-cycle jitter corresponds to a rate of change in a number of frames per second (NFPS) being input into a frame buffer associated with the CPU.

25. The method of claim 24, wherein adjusting the operating mode of the CPU comprises adjusting a power level and/or a frequency at which the CPU is operating.

26. The method of claim 24, wherein monitoring the cycle-to-cycle jitter comprises establishing: a jitter control signal based on short-term sampling of the NFPS being input to the frame buffer; and a trend control signal based on long-term sampling of the NFPS being input to the frame buffer.

27. The method of claim 26, wherein the jitter control signal and the trend control signal are used to produce a final control signal whose value maps to a particular operating mode of the CPU.

28. The method of claim 27, wherein the value of the final control signal defines a number of cores to be operating within the CPU.

29. The method of claim 26, wherein the operating mode of the CPU is adjusted via a control signal that is selected from a maximum of the jitter control signal and the trend control signal.

30. The method of claim 26, wherein the steps further include comprising applying a first gain value to the jitter control signal and applying a second gain value to the trend control signal.

* * * * *